(12) United States Patent
Jung et al.

(10) Patent No.: US 12,435,328 B2
(45) Date of Patent: Oct. 7, 2025

(54) THERAPEUTIC ENZYME FUSION PROTEIN HAVING A NOVEL STRUCTURE AND USE THEREOF

(71) Applicant: HANMI PHARM. CO., LTD., Hwaseong-si (KR)

(72) Inventors: Eui Joon Jung, Hwaseong-si (KR); Jin Young Kim, Hwaseong-si (KR); In Young Choi, Hwaseong-si (KR); Sung Youb Jung, Hwaseong-si (KR)

(73) Assignee: HANMI PHARM. CO., LTD., Hwaseong-si (KR)

(*) Notice: Subject to any disclaimer, the term of this patent is extended or adjusted under 35 U.S.C. 154(b) by 1111 days.

(21) Appl. No.: 16/955,525

(22) PCT Filed: Dec. 21, 2018

(86) PCT No.: PCT/KR2018/016487
§ 371 (c)(1),
(2) Date: Jun. 18, 2020

(87) PCT Pub. No.: WO2019/125059
PCT Pub. Date: Jun. 27, 2019

(65) Prior Publication Data
US 2021/0009984 A1    Jan. 14, 2021

(30) Foreign Application Priority Data
Dec. 22, 2017  (KR) .................. 10-2017-0178378

(51) Int. Cl.
C12N 9/62 (2006.01)
C12N 9/38 (2006.01)
C12N 9/40 (2006.01)
C12N 9/96 (2006.01)
A61K 38/00 (2006.01)
C12N 15/62 (2006.01)

(52) U.S. Cl.
CPC ............ C12N 9/96 (2013.01); C12N 9/2465 (2013.01); C12N 9/2471 (2013.01); A61K 38/00 (2013.01); C07K 2319/30 (2013.01); C12N 15/62 (2013.01); C12Y 302/01022 (2013.01); C12Y 302/01023 (2013.01)

(58) Field of Classification Search
CPC .. C07K 14/755; C07K 16/00; C07K 16/2866; C07K 2317/14; C07K 2317/72
USPC ........................................ 435/7.1, 69.7, 208
See application file for complete search history.

(56) References Cited

U.S. PATENT DOCUMENTS

2005/0281805 A1   12/2005  Lebowitz et al.
2008/0300188 A1   12/2008  Yang et al.
2020/0157172 A1*  5/2020   Heo ..................... A61P 25/00

FOREIGN PATENT DOCUMENTS

| EP | 3 650 539 A2 | 5/2020 |
| JP | 2009-521912 A | 6/2009 |
| JP | 2016-526909 A | 9/2016 |
| KR | 10-0254759 B1 | 5/2000 |
| KR | 2002-0073127 A | 9/2002 |
| KR | 10-2017-0091056 A | 8/2017 |
| WO | 93/15210 A1 | 8/1993 |
| WO | 96/32478 A1 | 10/1996 |
| WO | 97/34631 A1 | 9/1997 |
| WO | 2006/108586 A2 | 10/2006 |
| WO | 2015/009052 A1 | 1/2015 |
| WO | 2017/062619 A2 | 4/2017 |
| WO | 2017/100467 A2 | 6/2017 |

OTHER PUBLICATIONS

Davos et al., (Proteins: Structure, Function and Genetics, 2000, vol. 41: 98-107.*
Kwiatkowski et al., Biochemistry 38:11643-11650, 1999.*
Wristlock et al., Quarterly Reviews of Biophysics 2003, vol. 36 (3): 307-340.*
Kisselev L., Structure, 2002, vol. 10: 8-9.*
Pilar Lloris-Garcerá et al., "Antiparallel Dimers of the Small Multidrug Resistance Protein EmrE Are More Stable Than Parallel Dimers", The Journal of Biological Chemistry, Jul. 27, 2012, vol. 287, No. 31, pp. 26052-26059.
*Homo sapiens* galactosidase, alpha, partial [synthetic construct], GenBank: AAP36507.1.
Michael Beck, "New therapeutic options for lysosomal storage disorders: enzyme replacement, small molecules and gene therapy", Hum Genet, 2007, pp. 1-22, vol. 121.
Frances M. Platt et al., "Lysosomal storage disorders: The cellular impact of lysosomal dysfunction", J. Cell Biol., pp. 723-734, vol. 199 No. 5.
Marijn Van Der Neut Kolfschoten et al., "Anti-Inflammatory Activity of Human IgG4 Antibodies by Dynamic Fab Arm Exchange", Science, Sep. 14, 2007, pp. 1554-1557, vol. 317.
International Search Report of PCT/KR2018/016487 dated Apr. 2, 2019 [PCT/ISA/210].
Scott C. Garman, "Structure-function relationships in α-galactosidase A", Acta Paediatr., 2007, vol. 96, No. 455 (30 pages total).
Decision on Registration dated Sep. 15, 2023 in Korean App. No. 10-2018-0167795.
JH Choi, et al., NCBI, Genbank, Accession No. NP_000160, "alpha-galactosidase A precursor [*Homo sapiens*]", 2017 (4 pages).

* cited by examiner

*Primary Examiner* — Tekchand Saidha
*Assistant Examiner* — Mohammad Y Meah
(74) *Attorney, Agent, or Firm* — Sughrue Mion, PLLC

(57) ABSTRACT

A fusion protein of a dimeric therapeutic enzyme and an immunoglobulin Fc region, a preparation method thereof, and a composition containing the fusion protein are disclosed.

8 Claims, 3 Drawing Sheets
Specification includes a Sequence Listing.

[FIG. 1]
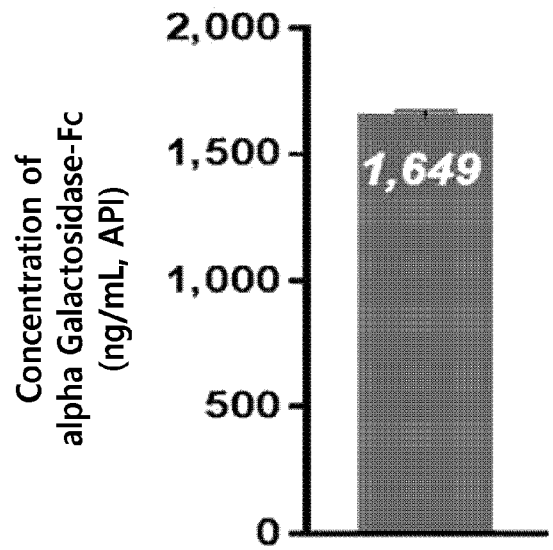
[FIG. 2]
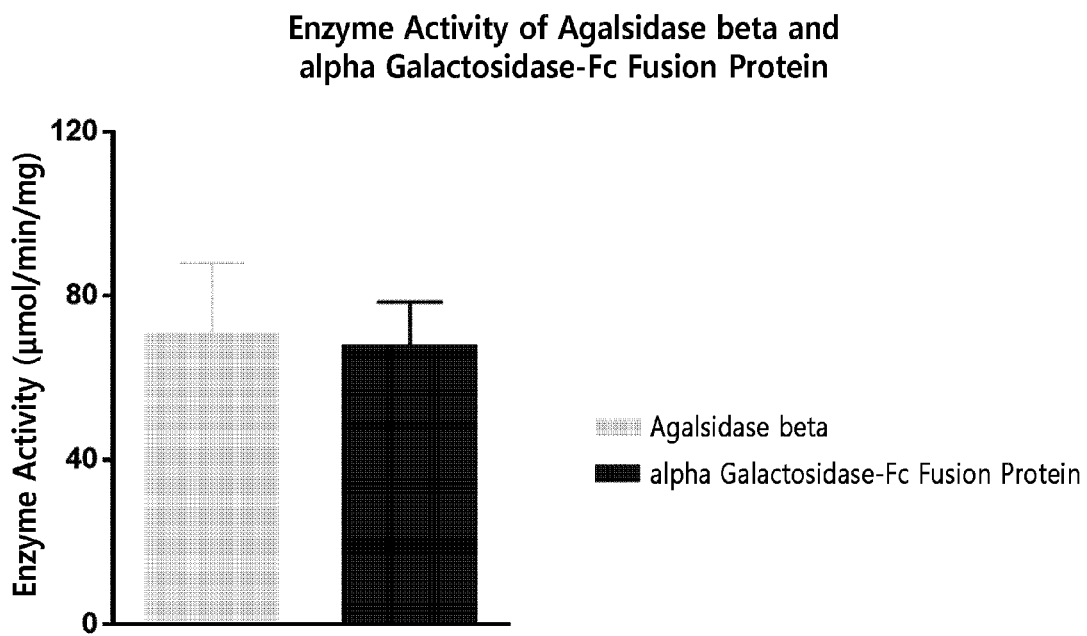

[FIG. 3]
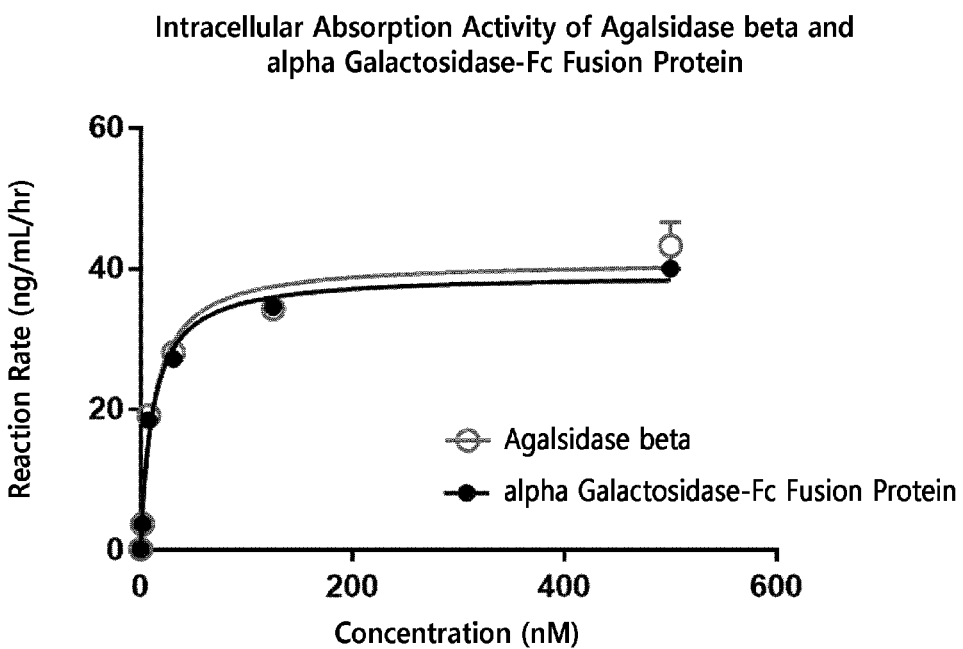

[FIG. 4]
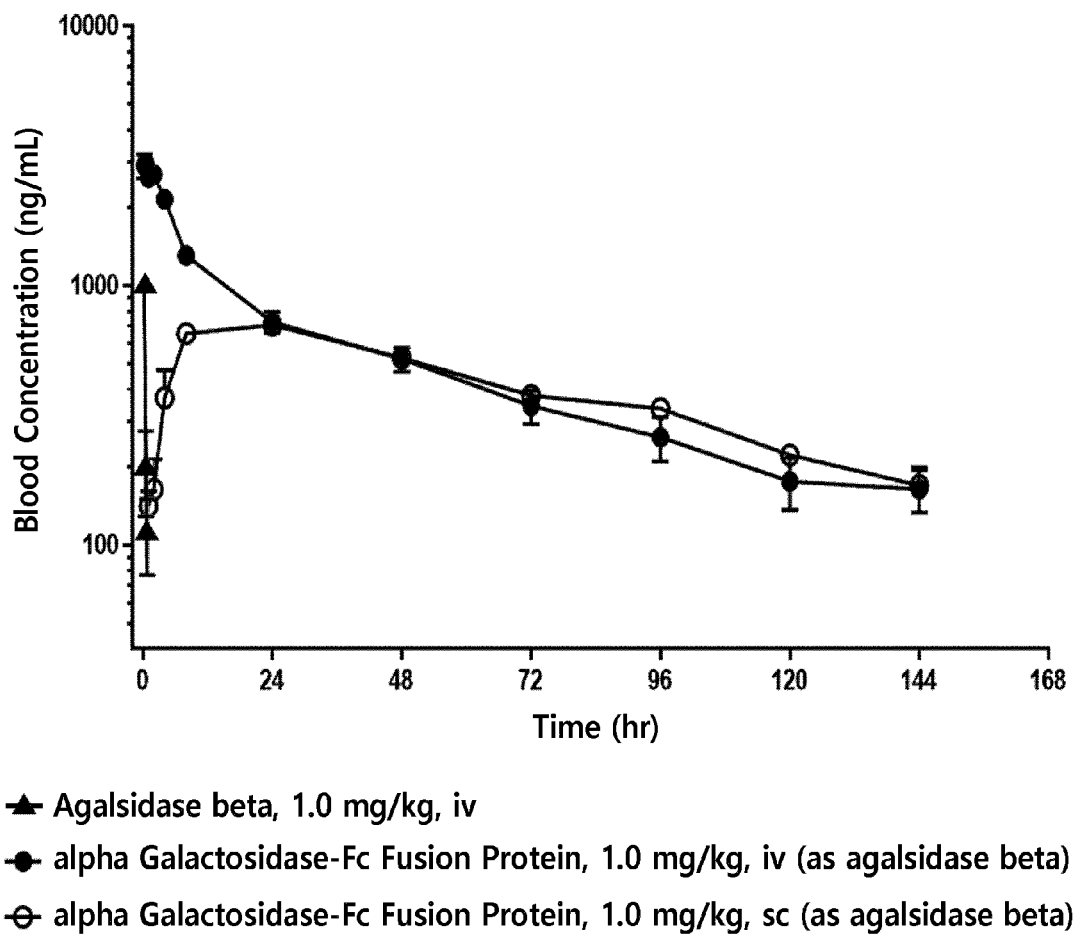
→▲— Agalsidase beta, 1.0 mg/kg, iv
→●— alpha Galactosidase-Fc Fusion Protein, 1.0 mg/kg, iv (as agalsidase beta)
—○— alpha Galactosidase-Fc Fusion Protein, 1.0 mg/kg, sc (as agalsidase beta)

THERAPEUTIC ENZYME FUSION PROTEIN HAVING A NOVEL STRUCTURE AND USE THEREOF

CROSS REFERENCE TO RELATED APPLICATIONS

This application is a National Stage of International Application No. PCT/KR2018/016487, filed Dec. 21, 2018, claiming priority to Korean Patent Application No. 10-2017-0178378, filed Dec. 22, 2017, the contents of all of which are incorporated herein by reference in their entirety.

TECHNICAL FIELD

The present invention relates to an enzyme fusion protein containing a dimeric therapeutic enzyme, a preparation method thereof, and a composition containing the same.

BACKGROUND ART

Lysosomes are cytoplasmatic organelles that function to degrade macromolecules such as proteins, polynucleotides, polysaccharides, and lipids. The internal environment of lysosomes is acidic, and hydrolase enzymes that promote the hydrolysis of biological macromolecules are contained therein. Lysosomes have also been found to have a certain role in the absorption of molecules through intracellular endocytosis.

Lysosomal storage disorders (hereinafter, LSDs) are inherited metabolic disorders characterized by loss of lysosomal functions. LSDs are caused by a deficiency of enzymes that degrade materials such as lipids, proteins, polysaccharides, etc., and they usually occur with an incidence of 1 in 100,000 and are inherited as autosomal recessive traits. LSDs appear when there is a deficiency or lack of specific degradative enzymes, and when these degradative enzymes are deficient, the resulting excess materials accumulate without being degraded, eventually causing problems in cell functions. Like many other genetic disorders, LSDs are inherited from parents. Additionally, each of these diseases occurs due to a mutation in any of the genes that are involved in the translation of different enzymes. Enzymes that cause these diseases usually have similar biochemical properties, and all of the LSDs are caused by the abnormal accumulation of materials in the lysosomes. Currently, about 50 different types of LSDs are known (e.g., Niemann-Pick disease, Fabry's disease, Gaucher disease, Hunter syndrome, Maroteaux-Lamy syndrome, etc.).

Fabry's disease, known as an LSD, is a kind of congenital metabolic disorder of glycosphingolipids which occurs as a result of a deficiency or lack of enzyme activity of alpha-galactosidase A, a hydrolase present in lysosomes.

alpha-Galactosidase A is an enzyme that hydrolyzes globotriaosylceramide (Gb3) into lactosylceramide, and it is known that a disorder in alpha-galactosidase A leads to abnormal accumulation of Gb3 in the walls of blood vessels and various parts of the body, thereby causing Fabry's disease to occur.

A representative method for treating these LSDs may be enzyme-replacement therapy (ERT), and many related studies are currently underway (Frances M. Platt et al., *J Cell Biol.* 2012 Nov. 26; 199 (5): 723 to 34). In particular, since LSDs are disorders caused by genetic defects in specific enzymes, replacement therapy is essential for the treatment of the defective enzymes. Enzyme replacement therapy is a standard therapy in LSDs, and the therapy has an effect of alleviating the existing symptoms or delaying the progress of the disease by replacing the deficient enzyme.

However, proteins exhibiting such therapeutic effects generally have low stability and are thus easily denatured and decomposed by proteases in the blood. Therefore, to maintain the blood concentration and potency of these proteins, frequent administration to patients is necessary.

However, in the case of protein drugs administered to patients in the form of injections, frequent injections to maintain the blood concentration of active polypeptides may cause significant pain to the patient. To solve these problems, there have been continuing efforts to maximize pharmacological efficacy by increasing the blood stability of the therapeutic enzymes and maintaining their blood concentration at a high level for a longer period of time. Such long-acting formulations of therapeutic enzymes are required to increase the stability of therapeutic enzymes and to simultaneously maintain the potency of the drugs themselves at a sufficiently high level, as well as to cause no immune reaction in patients.

Accordingly, there is a need for the development of a therapeutic agent having a therapeutic effect on a target disease, in which the activity of a fusion protein is maintained while the duration of the fusion protein is stably increased in vivo.

DISCLOSURE

Technical Problem

An object of the present invention is to provide an enzyme fusion protein of the following Formula 1:

[Formula 1]

in which X and X' are each independently the same or a different kind of therapeutic enzyme;

L and L' are linkers, each independently the same or a different kind of linker;

F is an immunoglobulin Fc region;

| is a covalent bond; and

: is a covalent or non-covalent bond.

Another object of the present invention is to provide a pharmaceutical composition for preventing or treating LSDs containing the enzyme fusion protein.

Still another object of the present invention is to provide a polynucleotide encoding the enzyme fusion protein.

Still another object of the present invention is to provide an expression vector containing the polynucleotide.

Still another object of the present invention is to provide a transformant into which the expression vector is introduced.

Still another object of the present invention is to provide a method for preparing an enzyme fusion protein, which includes culturing the transformant to obtain a culture; and recovering an enzyme fusion protein from the culture.

Technical Solution

An aspect of the present invention provides an enzyme fusion protein in which a therapeutic enzyme and an immunoglobulin Fc region are fused together.

In a specific embodiment of the present invention, the enzyme fusion protein may be represented by the following Formula 1:

[Formula 1]

in which X and X' are each independently the same or a different kind of therapeutic enzyme;
L and L' are linkers, each independently the same or a different kind of linker;
F is an immunoglobulin Fc region;
| is a covalent bond; and
: is a covalent or non-covalent bond.

In the enzyme fusion protein according to the previous specific embodiments, the therapeutic enzymes may form a dimer through a non-covalent bond.

In the enzyme fusion protein according to any one of the previous specific embodiments, the therapeutic enzymes may form a dimer in anti-parallel configuration with each other.

In the enzyme fusion protein according to any one of the previous specific embodiments, the enzyme fusion protein may have increased stability and reduced binding affinity for lysosome receptors, compared to a therapeutic enzyme to which an immunoglobulin Fc region is not fused.

In the enzyme fusion protein according to any one of the previous specific embodiments, the enzyme may be selected from the group consisting of beta-glucosidase, alpha-galactosidase, beta-galactosidase, iduronidase, iduronate-2-sulfatase, galactose-6-sulfatase, acid alpha-glucosidase, acid ceramidase, acid sphingomyelinase, galactocerebrosidase, arylsulfatase A, B, beta-hexosaminidase A, B, heparin N-sulfatase, alpha-D-mannosidase, beta-glucuronidase, N-acetylgalactosamine-6-sulfatase, lysosomal acid lipase, alpha-N-acetyl-glucosaminidase, glucocerebrosidase, butyrylcholinesterase, chitinase, glutamate decarboxylase, imiglucerase, lipase, uricase, platelet-activating factor acetylhydrolase, neutral endopeptidase, and myeloperoxidase.

In the enzyme fusion protein according to any one of the previous specific embodiments, the enzyme may be alpha-galactosidase A or beta-galactosidase.

In the enzyme fusion protein according to any one of the previous specific embodiments, the immunoglobulin Fc region may have a variation selected from the group consisting of substitution, addition, deletion, modification, and a combination thereof in at least one amino acid of a native immunoglobulin Fc region.

In the enzyme fusion protein according to any one of the previous specific embodiments, in the immunoglobulin Fc region having the amino sequence of SEQ ID NO: 8, the 2 amino acid may be substituted with proline; the $71^{st}$ amino acid is substituted with glutamine; or the 2 amino acid may be substituted with proline and the $71^{st}$ amino acid may be substituted with glutamine.

In the enzyme fusion protein according to any one of the previous specific embodiments, no chain exchange may occur in the immunoglobulin Fc region.

In the enzyme fusion protein according to any one of the previous specific embodiments, the immunoglobulin Fc region may be selected from the group consisting of:
(a) a CH1 domain, a CH2 domain, a CH3 domain, and a CH4 domain;
(b) a CH1 domain and a CH2 domain;
(c) a CH1 domain and a CH3 domain;
(d) a CH2 domain and a CH3 domain; and
(e) a combination between one or two or more domains among a CH1 domain, a CH2 domain, a CH3 domain, and a CH4 domain and an immunoglobulin hinge region or a part of the hinge region.

In the enzyme fusion protein according to any one of the previous specific embodiments, the immunoglobulin Fc region may be in the form of a monomer.

In the enzyme fusion protein according to any one of the previous specific embodiments, the immunoglobulin Fc region may consist of a hinge region, a CH2 domain, and a CH3 domain.

In the enzyme fusion protein according to any one of the previous specific embodiments, in the immunoglobulin Fc region:
a region capable of forming a disulfide bond may be removed;
a certain amino acid residue may be removed at the N-terminus of a native Fc;
a methionine residue may be added at the N-terminus of a native Fc form;
a complement-binding site may be removed; or
an antibody-dependent cell-mediated cytotoxicity (ADCC) site may be deleted.

In the enzyme fusion protein according to any one of the previous specific embodiments, the immunoglobulin Fc region may be aglycosylated.

In the enzyme fusion protein according to any one of the previous specific embodiments, the immunoglobulin Fc region may be an Fc fragment derived from IgG, IgA, IgD, IgE, or IgM.

In the enzyme fusion protein according to any one of the previous specific embodiments, the immunoglobulin Fc region may be a hybrid of domains having different origins derived from immunoglobulins selected from the group consisting of IgG, IgA, IgD, IgE, and IgM.

In the enzyme fusion protein according to any one of the previous specific embodiments, the immunoglobulin Fc region may be an IgG4 Fc region.

In the enzyme fusion protein according to any one of the previous specific embodiments, the hinge region of the IgG4 Fc region may be substituted with an IgG1 hinge region.

In the enzyme fusion protein according to any one of the previous specific embodiments, the enzyme fusion protein may include an amino acid sequence of SEQ ID NO: 13.

Another aspect of the present invention provides a pharmaceutical composition for preventing or treating LSDs containing the enzyme fusion protein.

In the composition according to a specific embodiment, the LSDs may be selected from the group consisting of mucopolysaccharidosis (MPS), glycogen storage disease, sphingolipidosis, Niemann-Pick disease, Fabry's disease, Gaucher disease, Hunter syndrome, and Maroteaux-Lamy syndrome.

In the composition according to the previous specific embodiment, the composition may reduce the binding affinity of an enzyme for lysosome receptors.

Still another aspect of the present invention provides a polynucleotide encoding the enzyme fusion protein.

Still another aspect of the present invention provides an expression vector containing the polynucleotide.

Still another aspect of the present invention provides a transformant into which the expression vector is introduced.

Still another aspect of the present invention provides a method for preparing an enzyme fusion protein.

In a method for preparing an enzyme fusion protein according to a specific embodiment, the method may include culturing the transformant to obtain a culture; and recovering an enzyme fusion protein from the culture.

Advantageous Effects of the Invention

The present invention relates to a fusion protein containing a dimeric therapeutic enzyme, and more specifically, to an enzyme fusion protein in which an immunoglobulin Fc region is fused to the therapeutic enzyme such that the therapeutic enzyme has increased stability and the mechanism of enzyme removal by the kidney is reduced. The enzyme fusion protein of the present invention can be effectively used by patients due to the increased duration of time. Additionally, the enzyme fusion protein of the present invention contains a dimeric therapeutic enzyme, and thus, it is possible to reduce the preparation step and the production cost can be reduced.

BRIEF DESCRIPTION OF DRAWINGS

FIG. 1 shows the measurement results illustrating the activity of an alpha-galactosidase-Fc fusion protein.

FIG. 2 shows the comparison results of in vitro enzymatic activity between agalsidase-beta and alpha-galactosidase-Fc fusion protein.

FIG. 3 shows a graph illustrating the comparison results of in vitro intracellular absorption activity between agalsidase-beta and alpha-galactosidase-Fc fusion protein.

FIG. 4 shows a graph illustrating the comparison results of pharmacokinetic behavior between agalsidase-beta and alpha-galactosidase-Fc fusion protein.

DETAILED DESCRIPTION OF THE INVENTION

The preferred embodiments are described in detail as follows. Meanwhile, respective descriptions and embodiments disclosed in the present disclosure may also be applied to other descriptions and embodiments. That is, all combinations of various elements disclosed in the present disclosure fall within the scope of the present invention. Further, the scope of the present invention is not limited by the specific description below.

Additionally, those skilled in the art will be able to recognize or confirm, based on routine experimentation, many equivalents to the specific embodiments of the present invention described in this application, and such equivalents are intended to be included in the present invention.

Throughout the entire specification, not only the conventional one-letter or three-letter codes for naturally occurring amino acids, but also those three-letter codes generally allowed for other amino acids are used, such as α-aminoisobutyric acid (Aib), Sar (N-methylglycine), α-methylglutamic acid, etc. Additionally, the amino acids mentioned in abbreviations herein are described according to the IUPAC-IUB rules as follows:

| Alanine | A; | Arginine | R; |
| Asparagine | N; | Aspartic acid | D; |
| Cysteine | C; | Glutamic acid | E; |
| Glutamine | Q; | Glycine | G; |
| Histidine | H; | Isoleucine | I; |
| Leucine | L; | Lysine | K; |
| Methionine | M; | Phenylalanine | F; |
| Proline | P; | Serine | S; |
| Threonine | T; | Tryptophan | W; |
| Tyrosine | Y; and | Valine | V. |

An aspect of the present invention provides an enzyme fusion protein of the following Formula 1;

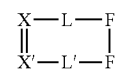

[Formula 1]

in which X and X' are each independently the same or a different kind of therapeutic enzyme;

L and L' are linkers, each independently the same or a different kind of linker;

F is an immunoglobulin Fc region;

| is a covalent bond; and

: is a covalent or non-covalent bond.

As used herein, the term "enzyme fusion protein" may refer to one in which an immunoglobulin Fc region is fused to a therapeutic enzyme such that the therapeutic enzyme can maintain its activity while its binding affinity for lysosome receptors is reduced, compared to a therapeutic enzyme to which an immunoglobulin Fc region is not fused, thereby increasing its blood half-life. The enzyme fusion protein of the present invention may be used as a drug for enzymatic replacement therapy (ERT). The enzymatic replacement therapy can prevent or treat a disease through recovery of the function of a deteriorated enzyme by supplementing the defective or deficient enzyme that causes the disease.

The present inventors have prepared a fusion protein with an immunoglobulin Fc region to increase the blood half-life of therapeutic enzymes. In particular, as the Fc region, an IgG4 Fc analog was used in which a potential glycosylation sequence is substituted to inhibit glycosylation and additionally a hinge sequence of IgG4 Fc is substituted to inhibit chain exchange.

Additionally, it was confirmed that in preparing the enzyme fusion protein of the present invention, when each therapeutic enzyme which is fused to an immunoglobulin Fc region forms a dimer, in particular a dimer linked in an anti-parallel configuration, the in vivo duration of the enzyme fusion protein can be increased while maintaining the activity of the therapeutic enzyme, and additionally, the preparation step of the enzyme fusion protein can be reduced, thereby enabling efficient production.

As such, the enzyme fusion protein of the present invention has advantages in that the activity of an enzyme can be maintained while the stability of the enzyme is increased, and that the production cost can be reduced, compared to a therapeutic enzyme to which an immunoglobulin Fc region is not fused.

As used herein, the term "therapeutic enzyme" refers to an enzyme for treating diseases that occur due to lack, deficiency, malfunction, etc. of an enzyme, and the enzyme can treat a subject with the diseases by enzyme replacement therapy, administration, etc. Specifically, the enzyme may be an enzyme for treating LSDs that may occur due to the lack, deficiency, etc. of lysosomal enzyme, but the enzyme is not limited thereto.

The therapeutic enzyme to be included in the enzyme fusion protein of the present invention is not particularly limited, but may include any therapeutic enzyme that can have an advantage of extended in vivo duration over a type of therapeutic enzyme to which an immunoglobulin Fc region is not fused. In an exemplary embodiment of the present invention, the enzyme fusion protein is a fusion protein of a therapeutic enzyme.

The therapeutic enzyme to be included in the enzyme fusion protein of the present invention may be one which forms a dimer through a non-covalent bond, but the therapeutic enzyme is not limited thereto. Specifically, the therapeutic enzyme may form a dimer when a fusion protein is expressed in a transformant and an immunoglobulin Fc region forms a dimer.

Such a dimer of therapeutic enzymes may be one formed by two enzymes identical to each other, or one formed by two different enzymes. The specific kinds of enzymes that constitute a dimer are not limited as long as these enzymes have the desired activity in vivo.

Meanwhile, these therapeutic enzymes constituting the dimer may be in the form of a parallel dimer or anti-parallel dimer depending on the direction in which they are connected, but the therapeutic enzymes are not limited thereto.

In an exemplary embodiment of the present invention, a fusion protein in which an alpha-galactosidase (i.e., a therapeutic enzyme) was fused to an immunoglobulin Fc region was prepared, and it was confirmed that alpha-galactosidases form an anti-parallel dimer through a non-covalent bond while the immunoglobulin Fc regions of the fusion protein form a dimer. Additionally, it was confirmed that the fusion protein can maintain the activity of an enzyme even in a state where the fusion protein is fused to an immunoglobulin Fc region (Example 2).

In another exemplary embodiment of the present invention, a fusion protein in which alpha-galactosidase is fused to an immunoglobulin Fc region and agalsidase-beta which is not fused to an immunoglobulin Fc region were compared. As a result, it was confirmed that the fusion protein maintained in vitro enzyme activity and intracellular absorption activity despite the fusion with an Fc region (Examples 2 and 3), and also confirmed that these fusion proteins had excellent pharmacokinetic behavior due to the fusion with an Fc region (Example 4).

As used herein, the term "parallel dimer" means that the N-terminus and C-terminus of the amino acid sequence of each monomer form a dimer in the same direction when each monomer forms a dimer. In particular, the dimer may be formed through a non-covalent bond or covalent bond, but the method of parallel dimer formation is not limited thereto.

As used herein, the term "anti-parallel dimer" means that the N-terminus and C-terminus of the amino acid sequence of each monomer form a dimer in a different direction from each other when each monomer forms a dimer. In particular, the dimer may be formed through a non-covalent bond or covalent bond, but the method of anti-parallel dimer formation is not limited thereto.

In other words, in the enzyme fusion protein of the present invention, it is possible that (i) the N-terminus of one therapeutic enzyme (X) and the N-terminus of another therapeutic enzyme (X') may form a dimer in the same direction; (ii) the C-terminus of one therapeutic enzyme (X) and the C-terminus of another therapeutic enzyme (X') may form a dimer in the same direction; (iii) the N-terminus of one therapeutic enzyme (X) and the C-terminus of another therapeutic enzyme (X') may form a dimer in the same direction; or (iv) the C-terminus of one therapeutic enzyme (X) and the N-terminus of another therapeutic enzyme (X') may form a dimer in the same direction. The dimers in cases (i) and (ii) are called parallel dimers and the dimers in cases (iii) and (iv) are called anti-parallel dimers. The formation of these dimers may be by a covalent bond or non-covalent bond, but the dimer formation is not limited thereto.

Specifically, in the formation of the above dimers, the formation of a parallel dimer or anti-parallel dimer may be such that, as the immunoglobulin Fc regions form a dimer, the alpha-galactosidase A of the monomers linked thereto forms a dimer through a covalent bond or non-covalent bond dimer.

With regard to the fusion protein containing the dimeric therapeutic enzyme in an anti-parallel configuration of the present invention, the process of preparing the fusion protein has excellent advantages in that it can decrease the number of preparation steps, thereby reducing the production cost, and that the enzyme activity can be maintained while decreasing the instability in dimer types due to a pH change in vivo.

The therapeutic enzyme of the present invention may be one selected from the group consisting of beta-glucosidase, alpha-galactosidase, beta-galactosidase, iduronidase, iduronate-2-sulfatase, galactose-6-sulfatase, acid alpha-glucosidase, acid ceramidase, acid sphingomyelinase, galactocerebrosidase, arylsulfatase A, B, beta-hexosaminidase A, B, heparin N-sulfatase, alpha-D-mannosidase, beta-glucuronidase, N-acetylgalactosamine-6 sulfatase, lysosomal acid lipase, alpha-N-acetyl-glucosaminidase, glucocerebrosidase, butyrylcholinesterase, chitinase, glutamate decarboxylase, imiglucerase, lipase, uricase, platelet-activating factor acetylhydrolase, neutral endopeptidase, and myeloperoxidase. The therapeutic enzyme of the present invention may be a human-derived enzyme, but any therapeutic enzyme having a therapeutic effect on LSDs may be included in the present invention without limitation, regardless of the origin or kind of the enzyme.

More specifically, the enzyme may be alpha-galactosidase A or beta-galactosidase.

As used herein, the term "alpha-galactosidase A" is an enzyme present in the lysosomes of the spleen, brain, liver, etc., which hydrolyzes terminal alpha-galactosyl moieties in glycolipids and glycoproteins, and is a homodimeric glycoprotein. Specifically, alpha-galactosidase A is known to hydrolyze ceramide trihexoside, catalyze the hydrolysis of melibiose into galactose and glucose, and in particular, is known to be associated with Fabry's disease, an LSD.

In the present invention, alpha-galactosidase A may be used interchangeably with agalsidase-alpha or agalsidase-beta (i.e., recombinant type), and any enzyme which has an equivalent activity and exhibits a therapeutic effect on LSDs can be included in the scope of the present invention without limitation, regardless of its sequence, origin, preparation method, etc. Specifically, alpha-galactosidase may be encoded by the polynucleotide sequence of SEQ ID NO: 5, and may include the amino acid sequence of SEQ ID NO: 6, but the sequences of alpha-galactosidase are not limited thereto.

The therapeutic enzyme included in the enzyme fusion protein of the present invention may be of a naturally occurring type, and a fragment consisting of a part of the therapeutic enzyme, or an analog of the therapeutic enzyme in which a variation selected from the group consisting of substitution, addition, deletion, and modification of some amino acids, and a combination thereof has occurred, may be included in the present invention without limitation, as long as it has an activity equivalent to that of a naturally occurring type of therapeutic enzyme.

Additionally, the analog of the therapeutic enzyme includes all of those where one or more amino acids are added to the amino terminus and/or carboxy terminus of the naturally occurring type of therapeutic enzyme.

For the substitution or addition of amino acids, not only the 20 amino acids commonly found in human proteins, but also atypical or non-naturally occurring amino acids may be used. Commercial sources of the atypical amino acids may include Sigma-Aldrich, ChemPep Inc., Genzyme Pharmaceuticals, etc. The peptides including these amino acids and atypical peptide sequences may be synthesized and purchased from commercial suppliers, e.g., American Peptide Company, Bachem (USA), or Anygen (Korea), but the commercial sources are not limited thereto.

As used herein, the term "fragment" refers to a form where one or more amino acids in the amino or carboxy terminus of a native therapeutic enzyme or an analog of a native therapeutic enzyme are removed. The native therapeutic enzyme or an analog thereof belongs to the scope of the present invention regardless of the size of the fragment or the kind of amino acids as long as they have an activity of a therapeutic enzyme.

The therapeutic enzyme analogs may include the biosimilars and biobetters of the corresponding therapeutic enzymes. For example, with respect to biosimilars, considering the difference in a host for its expression compared to a known therapeutic enzyme, the difference in glycosylation feature and the degree thereof, and the difference in the degree of substitution in a particular amino acid residue of the corresponding enzyme in light of the standard sequence where the degree of substitution is not 100% substitution, they belong to the biosimilar enzymes to be used as the enzyme fusion protein of the present invention. The therapeutic enzymes may be produced by a known method in the art, specifically by genetic recombination in animal cells, $E.$ $coli$, yeast, insect cells, plant cells, live animals, etc., and the preparation method is not limited thereto, and commercially available enzymes may be purchased and used, but the enzymes are not limited thereto.

Additionally, the therapeutic enzymes may include an amino acid sequence which has a homology of at least 60%, 70%, or 80%, more specifically 90%, and even more specifically 91%, 92%, 93%, 94%, 95%, 96%, 97%, 98%, or 99% or higher to that of the above enzymes or analogs thereof, and the therapeutic enzymes may be obtained from microorganisms by recombinant technology or those which are commercially available, but the therapeutic enzymes are not limited thereto.

As used herein, the term "homology" represents the degree of similarity to the wild-type amino acid sequence or a wild-type nucleotide sequence, and the homology comparison can be performed by the naked eye or using a comparison program that can be easily purchased. The homologies between two or more sequences can be calculated as a percentage (%) using a commercial computer program. The homology (%) may be calculated for the neighboring sequences.

The information on the sequences of the therapeutic enzymes or analogs thereof and the nucleotide sequences encoding the same can be obtained from a known database (e.g., NCBI, etc.).

The therapeutic enzyme may be prepared or manufactured by a method known in the art, and specifically, the enzyme may be purified from the culture after culturing animal cells into which an animal expression vector is inserted, or may be used after purchasing commercially available enzymes, but the enzyme is not limited thereto.

The enzyme fusion protein of the present invention may be one in which a therapeutic enzyme and an immunoglobulin Fc region are fused through a peptide linker. That is, L or L' of Formula 1 may be a peptide linker, but L or L' are not particularly limited as long as they can fuse an immunoglobulin Fc region with a therapeutic enzyme.

The peptide linker may include at least one amino acid, for example, 1 to 1,000 amino acids, any peptide linker known in the art (e.g., including [GS]x linker, [GGGS (SEQ ID NO: 15)]x linker, and [GGGGS (SEQ ID NO: 16)]x linker, etc., in which x is a natural number of 1 or greater (e.g., 1, 2, 3, 4, 5, or greater), but the peptide linker is not particularly limited thereto. Specifically, the peptide linker of the present invention may consist of 10 to 50 amino acid sequences, and more specifically 20 to 40 amino acid sequences, and may consist of the amino acid sequence of SEQ ID NO: 11.

For the purpose of the present invention, the position at which a peptide linker is fused to a therapeutic enzyme and an immunoglobulin Fc is not limited as long as the peptide linker can link the therapeutic enzyme and the immunoglobulin Fc while maintaining the activity of the therapeutic enzyme, specifically, both ends of the therapeutic enzyme and the immunoglobulin Fc region, and more specifically, the C-terminus of the therapeutic enzyme and the N-terminus of the immunoglobulin Fc region, but the position is not limited thereto.

As used herein, the terms "N-terminus" and "C-terminus" refer to an amino end and a carboxyl end of a protein, respectively. For example, "N-terminus" or "C-terminus" may include not only the most terminal amino acid residue of the N-terminus or C-terminus, but also the amino acid residues adjacent to the amino acid residue of the N-terminus or C-terminus, and specifically, the $1^{st}$ amino acid residue to the $20^{th}$ amino acid residue from the terminus itself, but the N-terminus or C-terminus is not limited thereto.

In an embodiment of the present invention, a fusion protein (SEQ ID NO: 13) in which the N-terminus of IgG4 is fused to the C-terminus of a therapeutic enzyme was prepared via synthesis such that alpha-galactosidase (a therapeutic enzyme) is fused to a linker-IgG4 at a gene level, and it was confirmed that the fusion protein is expressed in a transformant into which the fusion protein is transformed (Example 2).

In the present invention, the peptide linker may be one which is linked to each immunoglobulin Fc region of a dimer formed by the immunoglobulin Fc region of monomers, and the linkers to be linked to each immunoglobulin Fc region may be the same or a different kind.

An immunoglobulin Fc region, which is a moiety of the enzyme fusion protein of the present invention, may be one in which a dimer is formed between the immunoglobulin Fc regions of each monomer.

As used herein, the term "immunoglobulin Fc region" refers to a region of an immunoglobulin molecule including the heavy chain constant region 2 (CH2) and/or the heavy chain constant region 3 (CH3), excluding the variable regions of the heavy and light chains. For the purpose of the present invention, such an immunoglobulin Fc region may include a modified hinge region, but is not limited thereto. Specifically, the immunoglobulin Fc region may be one which has a variation selected from the group consisting of substitution, addition, deletion, modification, and a combination thereof in at least one amino acid of a native immunoglobulin Fc region, but the immunoglobulin Fc region is not limited thereto.

The immunoglobulin Fc region is a material used as a carrier in preparing drugs, and fusion protein studies using an immunoglobulin Fc region have been actively conducted recently so as to stabilize proteins and prevent them from being removed from the kidneys. Immunoglobulins are major constituents of the blood, and there are five different types (i.e., IgG, IgM, IgA, IgD, and IgE). The most frequently used type for fusion protein studies is IgG, and it is classified into four subtypes. Fusion proteins prepared using an immunoglobulin Fc can increase the protein size and thereby prevent their removal in the kidneys and also bind to FcRn receptors, and thereby have a role in increasing blood half-life through endocytosis and recycling into cells.

Such an immunoglobulin Fc region may include a hinge region in the heavy chain constant region, and the monomeric immunoglobulin Fc regions can form a dimer due to the hinge region, but the immunoglobulin Fc region is not limited thereto. Additionally, the immunoglobulin Fc region of the present invention may be an extended Fc region including all or part of the heavy chain constant region 1 (CH1) and/or the light constant region 1 (CL1), excluding the variable regions of the heavy and light chains of an immunoglobulin, as long as the immunoglobulin Fc region has an effect the same as or superior to that of its native type. Additionally, the immunoglobulin Fc region of the present invention may be a region in which a part of a significantly long amino acid sequence corresponding to CH2 and/or CH3 is removed.

Specifically, the immunoglobulin Fc region of the present invention may be one selected from the group consisting of (a) a CH1 domain, a CH2 domain, a CH3 domain, and a CH4 domain; (b) a CH1 domain and a CH2 domain; (c) a CH1 domain and a CH3 domain; (d) a CH2 domain and a CH3 domain; and (e) a combination between one or two or more domains among a CH1 domain, a CH2 domain, a CH3 domain, and a CH4 domain and an immunoglobulin hinge region or a part of the hinge region, but the immunoglobulin Fc region is not limited thereto. More specifically, the immunoglobulin Fc region may be one which consists of a hinge region, a CH2 domain, and a CH3 domain, but the immunoglobulin Fc region is not limited thereto.

In an embodiment, the hinge region may be one in which a part of the hinge sequence having the following amino acid sequence is deleted or modified.

(SEQ ID NO: 14)
Glu-Ser-Lys-Tyr-Gly-Pro-Pro-Cys-Pro-Ser-Cys-Pro

Specifically, the hinge region may be one having a variation where a part of the hinge region is deleted to include only one cysteine (Cys) residue; or may be one where a serine (Ser) residue involved in chain exchange is substituted with a proline (Pro) residue, and more specifically, one where the $2^{nd}$ serine of the hinge sequence is substituted with a proline residue, but the hinge region is not limited thereto.

In the present invention, an immunoglobulin Fc region can increase the stability of a fused therapeutic enzyme while preventing the chain exchange and formation of monomers in an Fc region by including a hinge region in its native form or a modified hinge region.

In the present invention, the immunoglobulin Fc region may be in the form of a monomer, but the immunoglobulin Fc region is not limited thereto. Specifically, the immunoglobulin Fc region which is denoted as F in Formula 1 above may be in the form of a monomer and expressed by a fusion with a monomeric therapeutic enzyme through a peptide linker. As the monomers of immunoglobulin Fc regions form a dimer, the therapeutic enzyme fused to the immunoglobulin Fc region may form a dimer by a non-covalent bond, but is not limited thereto.

The immunoglobulin Fc region used as a drug carrier has a disadvantage in that it can cause an unintended immune response, for example, having effector functions such as antibody-dependent cell-mediated cytotoxicity (ADCC) and complement-dependent cytotoxicity (CDC). These functions occur through the binding of an immunoglobulin Fc region to an Fc receptor or complement, or glycosylation of the Fc region. In addition, it is highly likely that instability of Fc itself may occur in vivo.

In the present invention, the present inventors have made efforts to solve the above problem by substituting the sequence of a hinge region in an immunoglobulin Fc region. Specifically, the immunoglobulin Fc region of the present invention may be one in which a potent glycosylation sequence is substituted for the regulation of glycosylation or the sequence involved in chain exchange is substituted, or may correspond to both cases. More specifically, the immunoglobulin Fc region of the enzyme fusion protein of the present invention may be one in which no chain exchange occurs.

Specifically, the immunoglobulin Fc region of the present invention may be one in which the $2^{nd}$ amino acid and/or the $71^{st}$ amino acid of the immunoglobulin Fc region of SEQ ID NO: 8 is substituted with a different amino acid for the prevention of chain exchange and N-glycosylation. More specifically, the immunoglobulin Fc region of the present invention may be 1) one in which the $2^{nd}$ amino acid (i.e., serine) is substituted with proline, 2) one in which the $71^{st}$ amino acid (i.e., asparagine) is substituted with glutamine, or 3) one in which the $2^{nd}$ amino acid is substituted with proline and the $71^{st}$ amino acid is substituted with glutamine, and specifically an immunoglobulin Fc region represented by the amino acid sequence of SEQ ID NO: 9, but the immunoglobulin Fc region is not limited thereto. In addition to the variations described above, the immunoglobulin Fc region may include an appropriate variation as a drug carrier for increasing stability of a therapeutic enzyme.

Specifically, the immunoglobulin Fc region may be one in which a hinge region of an immunoglobulin IgG4 Fc is substituted with an IgG1 hinge region, but the immunoglobulin Fc region is not limited thereto.

In an embodiment of the present invention, the $2^{nd}$ amino acid of an immunoglobulin Fc is substituted with proline and the $71^{st}$ amino acid of the immunoglobulin Fc is substituted with glutamine, and thereby chain exchange and N-glycosylation were reduced (Example 1).

As used herein, the term "chain exchange" refers to a problem in that when an IgG4 Fc is used as a carrier of a protein fusion body, the IgG4 Fc forms a hybrid with an IgG4 present in vivo or is present as a monomer and alters the original structure to have a structure with a low therapeutic activity, and it was previously reported that there is significant difficulty when a protein fusion body, in which a protein is fused, is used for therapeutic purposes (van der Neut Kolfschoten, et al., *Science*, 317:1554 to 1557. 2007).

Additionally, in another specific embodiment, the immunoglobulin Fc region of the present invention not only includes native amino acid sequences but also sequence analogs thereof. An amino acid analog means that a variation selected from the group consisting of substitution, addition, deletion, modification, and a combination thereof has occurred in at least one amino acid residue of a native amino acid sequence.

For example, amino acid residues at positions 214 to 238, 297 to 299, 318 to 322, or 327 to 331 in IgG Fc, which are known to be important for linkage, may be used as the sites suitable for variation.

Additionally, various types of analogs are possible, for example, one where the site capable of forming a disulfide bond is moved; one where several N-terminal amino acids from native Fc are removed; one where a methionine residue is added to the N-terminus of native Fc, etc. Additionally, complement binding sites (e.g., Clq binding sites) or antibody-dependent cell-mediated cytotoxicity (ADCC) sites may be removed to remove the effector function. The techniques for preparing the sequence analogs of an immunoglobulin Fc region are disclosed in International Publication Nos. WO 97/34631, WO 96/32478, etc.

Amino acid substitutions in a protein or peptide molecule that do not alter the entire activity of a molecule are well known in the art (H. Neurath, R L. Hill, *The Proteins*, Academic Press, New York, 1979). The most common substitutions occur between amino acid residues of Ala/Ser, Val/Ile, Asp/Glu, hr/Ser, Ala/Gly, Ala/Thr, Ser/Asn, Ala/Val, Ser/Gly, Thy/Phe, Ala/Pro, Lys/Arg, Asp/Asn, Leu/Ile, Leu/Val, Ala/Glu, and Asp/Gly. In some cases, amino acids may be modified by phosphorylation, sulfation, acrylation, glycosylation, methylation, farnesylation, acetylation, amidation, etc.

Additionally, the Fc analogs described above may be those which exhibit the same biological activity as the Fc region of the present invention, but which have increased structural stability of the Fc region against heat, pH, etc.

Additionally, such an Fc region may be obtained from a native type isolated from humans or animals (e.g., cows, goats, pigs, mice, rabbits, hamsters, rats, guinea pigs, etc.) or may be recombinants or analogs thereof obtained from transformed animal cells or microorganisms. Herein, the Fc region may be obtained from native Fc by isolating whole immunoglobulins from human or animal organisms and treating them with a protease. Papain digests the native Fc region into Fab and Fc regions, and pepsin treatment results in the production of pF'c and F(ab)$_2$ fragments. These fragments may be subjected to size exclusion chromatography to isolate Fc or pF'c. In a more specific embodiment, the Fc region may be a recombinant immunoglobulin Fc region where a human-derived Fc region is obtained from a microorganism.

Additionally, the immunoglobulin Fc region may be in the form of native glycan, increased or decreased glycans compared to its native type, or in a deglycosylated or aglycosylated form. The increase, decrease, or removal of the immunoglobulin Fc glycans may be achieved by conventional methods such as a chemical method, enzymatic method, and genetic engineering method using a microorganism. In particular, the immunoglobulin Fc region where the glycans are removed from the Fc region shows a significant decrease in binding affinity for the complement (Clq) and a decrease or removal of antibody-dependent cytotoxicity or complement-dependent cytotoxicity, and thus it does not induce unnecessary immune responses in vivo. In this regard, an immunoglobulin Fc region in a deglycosylated or aglycosylated immunoglobulin Fc region may be a more suitable form to meet the original object of the present invention as a drug carrier.

As used herein, the term "deglycosylation" refers to removal of sugar moieties from an Fc region by an enzyme, and the term "aglycosylation" refers to an unglycosylated Fc region produced in prokaryotes, more specifically, *E. coli*.

Meanwhile, the immunoglobulin Fc region may be derived from humans or animals (e.g., cows, goats, pigs, mice, rabbits, hamsters, rats, guinea pigs, etc.), and in a more specific embodiment, it may be derived from humans.

Additionally, the immunoglobulin Fc region may be an Fc region derived from IgG, IgA, IgD, IgE, IgM, or a combination or hybrid thereof. In a more specific embodiment, it may be derived from IgG or IgM, which are among the most abundant proteins in human blood, and in an even more specific embodiment, it may be derived from IgG, which is known to enhance the half-lives of ligand-binding proteins. In a more specific embodiment, the immunoglobulin Fc region may be an IgG4 Fc region, in an even more specific embodiment, it may be an aglycosylated Fc region derived from a human IgG4, and in the most specific embodiment, the amino acid sequence of the immunoglobulin Fc region is SEQ ID NO: 9 and the polynucleotide sequence encoding the amino acid sequence may be SEQ ID NO: 7, but the immunoglobulin Fc region is not limited thereto.

As used herein, the term "combination" means that polypeptides encoding single-chain immunoglobulin Fc regions of the same origin are linked to a single-chain polypeptide of a different origin to form a dimer or multimer. That is, a dimer or multimer may be prepared from two or more fragments selected from the group consisting of Fc fragments of IgG Fc, IgA Fc, IgM Fc, IgD Fc, and IgE Fc.

Additionally, the therapeutic enzymes or enzyme fusion proteins of the present invention may be those where the N-terminus and/or C-terminus of the proteins are not modified, but, for protecting the therapeutic enzymes from proteases and increasing stability of therapeutic enzymes in vivo, those therapeutic enzymes or enzyme fusion proteins where the N-terminus and/or C-terminus of the therapeutic enzymes are chemically modified or protected by an organic group, or the amino terminus of the therapeutic enzymes is modified by the addition of an amino acid, etc. are also included in the scope of the proteins according to the present invention. When the C-terminus of the therapeutic enzymes is not modified, the termini of the therapeutic enzymes or enzyme fusion proteins according to the present invention may have a carboxyl terminus, but the therapeutic enzymes or enzyme fusion proteins of the present invention are not particularly limited thereto.

In particular, since the N-terminus and C-terminus of chemically synthesized proteins have charges, the N-terminus may be acetylated and/or the C-terminus may be amidated so as to remove these charges, but the methods are not particularly limited thereto.

Unless otherwise specified in the present specification, the technologies with regard to "enzyme" or "fusion protein" according to the present invention described in the detailed description or claims of the present invention will be applied not only to the subject enzyme or fusion protein, but also to the scope which includes all of the salts of the subject enzyme or fusion protein (e.g., a pharmaceutically acceptable salt of the fusion protein), or a solvate thereof. Accordingly, although it is simply described as "enzyme" or "fusion protein" in the specification, the subject description will likewise be applied to the specific salt, the specific solvate, and the specific solvate of the specific salt. Such salt forms may be in a form, for example, using any pharmaceutically acceptable salt, but the kind of the salt is not particularly limited. Those salt forms may be, for example, those which are safe and effective to mammals, but the salt forms are not particularly limited thereto.

As used herein, the term "pharmaceutically acceptable" refers to a material which can be effectively used for the intended use without causing excessive toxicity, stimulation, or allergic reactions, etc. within the range of medico-pharmaceutical decision.

As used herein, the term "pharmaceutically acceptable salt" refers to a salt derived from pharmaceutically acceptable inorganic salts, organic salts, or bases. Examples of the suitable acids may include hydrochloric acid, bromic acid, sulfuric acid, nitric acid, perchloric acid, fumaric acid, maleic acid, phosphoric acid, glycolic acid, lactic acid, salicylic acid, succinic acid, toluene-p-sulfonic acid, tartaric acid, acetic acid, citric acid, methanesulfonic acid, formic acid, benzoic acid, malonic acid, naphthalene-2-sulfonic acid, benzenesulfonic acid, etc. Examples of the salts derived from suitable bases may include alkali metals such as sodium, potassium, etc.; alkali earth metals such as magnesium; ammonium, etc.

Additionally, as used herein, the term "solvate" refers to a complex formed between a solvent molecule and the enzyme, fusion protein according to the present invention, or a salt thereof.

The enzyme fusion protein of the present invention may be prepared by a method known in the art.

In an embodiment of the present invention, a recombinant vector was prepared where alpha-galactosidase (i.e., therapeutic enzyme) can be expressed in a form fused to a peptide linker-immunoglobulin Fc, and the therapeutic enzyme was prepared by expressing it in a CHO cell line (Examples 1 and 2).

However, the enzyme fusion protein of the present invention may be prepared by methods other than those described in the above embodiments. The enzyme fusion protein of the present invention may include the amino acid sequence of SEQ ID NO: 13, but the amino acid sequence is not limited thereto.

The enzyme fusion protein according to the present invention can increase the half-life of a therapeutic enzyme that exhibits a therapeutic effect on LSDs, by increasing in vivo stability of the therapeutic enzyme while maintaining the activity of the therapeutic enzyme, via a fusion of the therapeutic enzyme to an immunoglobulin Fc region. In particular, a therapeutic enzyme fused to a modified immunoglobulin Fc region has reduced chain exchange and glycosylation, and thus can have a lower binding affinity for lysosome receptors compared to a therapeutic enzyme to which Fc is not fused, and can thereby have high duration, confirming that such a therapeutic enzyme is effective for the treatment of LSDs.

Still another aspect of the present invention provides a pharmaceutical composition for preventing or treating LSDs containing the enzyme fusion protein as an active ingredient.

The composition according to the present invention is characterized in that the in vivo duration and stability of a therapeutic enzyme are increased.

Specifically, the enzyme fusion protein of a pharmaceutical composition of the present invention may be one in which alpha-galactosidase A and an immunoglobulin Fc region are fused together, but the enzyme fusion protein is not limited thereto.

Additionally, the composition according to the present invention may be one in which alpha-galactosidase A (i.e., therapeutic enzyme) in a fusion protein can also form a dimer when immunoglobulin Fc regions form a dimer, and more specifically, the dimer of alpha-galactosidase A is a dimer formed by a mutual non-covalent bond, and in particular, it is characterized in that a dimer is formed in an anti-parallel orientation.

As used herein, the term "lysosome", being one of the organelles present in the cytoplasm, contains many hydrolases and thus decomposes unwanted materials in the body such as macromolecules, bacteria, etc., and aids in the utilization of the decomposed products in other parts of cells. The functions of a lysosome can be performed by many enzymes. When a particular enzyme loses its function due to a variation, deficiency, etc., it causes the loss of the decomposing function of the lysosome and results in the accumulation of macromolecules, etc., which must be decomposed, in the cell and induces cell damage, etc. thereby causing a disease.

As used herein, the term "lysosomal storage disease (LSD)" refers to a rare genetic disease due to the loss of lysosomal functions described above, and enzymatic replacement therapy using a defective enzyme is essential. The LSD may include mucopolysaccharidosis (MPS), glycogen storage disease, sphingolipidosis, Niemann-Pick disease, Fabry's disease, Gaucher disease, Hunter syndrome, Maroteaux-Lamy syndrome, etc.

As used herein, the term "Fabry's disease", which is an LSD, is inherited as a recessive form associated with sex chromosomes and caused by X-inactivation. Fabry's disease is a congenital metabolic disorder of glycosphingolipids which occurs due to the lack or deficiency in the activity of alpha-galactosidase A, which is a hydrolase present in the lysosome. The defect in alpha-galactosidase A is known to cause abnormal accumulation of globotriaosylceramide (Gb3) in the walls of blood vessels and various parts of the body (e.g., skin, kidney, heart, nervous systems, etc.) and thereby affect blood circulation and decrease the nutrient supply. Symptoms of anhidrosis (lack of sweating), parathesia, severe pain, angina keratoma, corneal opacity, cardiac ischemia, myocardial infarction, kidney failure, etc. may be exhibited, resulting in kidney failure and eventually leading to death.

As used herein, the term "prevention" refers to all activities that inhibit or delay the occurrence of LSDs by administering the enzyme fusion protein or composition containing the enzyme fusion protein, and the term "treatment" refers to all activities that improve or advantageously change the symptoms of LSDs by administering the enzyme fusion protein or composition containing the enzyme fusion protein.

As used herein, the term "administration" refers to the introduction of a particular substance into a patient by any appropriate method, and the administration route of the composition may be any conventional route that enables delivery of the composition to the target in vivo, for example, intraperitoneal administration, intravenous administration, intramuscular administration, subcutaneous administration, intradermal administration, oral administration, local administration, intranasal administration, intrapulmonary administration, intrarectal administration, etc. However, since peptides are digested upon oral administration, active ingredients of a composition for oral administration are preferably coated or formulated for protection against degradation in the stomach, and specifically, may be administered in an injectable form. Additionally, the pharmaceutical composition may be administered using a certain device capable of transporting the active ingredients into a target cell.

The total effective dose of the pharmaceutical composition of the present invention may be administered to a patient in a single dose or may be administered for a long period of time in multiple doses according to a fractionated treatment protocol. In the pharmaceutical composition of the present invention, the content of the active ingredient may vary depending on the disease severity. Specifically, the total daily dose of the fusion protein of the present invention may be about 0.0001 mg to 500 mg per 1 kg of body weight of a patient. However, the effective dose of the fusion protein is determined considering various factors including the patient's age, body weight, health conditions, sex, disease severity, diet, excretion rate, etc. in addition to administration route and treatment frequency of the pharmaceutical composition. In this regard, those skilled in the art may easily determine the effective dose suitable for the particular use of the pharmaceutical composition of the present invention. The pharmaceutical composition according to the present invention is not particularly limited to the formulation, administration route, and method, as long as it shows the effects of the present invention.

In the present invention, the actual dose of the enzyme fusion protein used as a carrier may be determined based on the types of the therapeutic enzyme used as an active ingredient along with various factors such as the disease to be treated, administration route, age, sex, and weight of a patient, severity of the disease, etc. Since the enzyme fusion protein of the present invention has significantly excellent in vivo duration, the dose, number, and frequency of administration of the pharmaceutical formulation containing the enzyme fusion protein of the present invention can be significantly reduced.

The pharmaceutical composition of the present invention may further contain a pharmaceutically acceptable carrier, excipient, or diluent. The pharmaceutically acceptable carrier may be non-naturally occurring.

As used herein, the term "pharmaceutically acceptable" refers to the properties of having a sufficient amount to exhibit a therapeutic effect and not cause adverse effects, and may be easily determined by those skilled in the art based on factors well known in the medical field, such as the kind of disease, age, weight, health conditions, sex, drug sensitivity of a patient, administration route, administration method, administration frequency, duration of treatment, a drug(s) to be mixed or administered simultaneously, etc.

The pharmaceutically acceptable carrier may include, for oral administration, a binder, a glidant, a disintegrant, an excipient, a solubilizing agent, a dispersant, a stabilizing agent, a suspending agent, a coloring agent, a flavoring agent, etc.; for injections, a buffering agent, a preserving agent, an analgesic, a solubilizing agent, an isotonic agent, a stabilizing agent, etc., which may be combined to be used; and for topical administrations, a base, an excipient, a lubricant, a preserving agent, etc.

The formulation type of the composition of the present invention may be prepared variously by combining with a pharmaceutically acceptable carrier described above. For example, for oral administration, the composition may be formulated into tablets, troches, capsules, elixirs, suspensions, syrups, wafers, etc. For injection, the composition may be formulated into unit-dose ampoules or multi-dose containers. Additionally, the composition may also be formulated into solutions, suspensions, tablets, pills, capsules, sustained-release formulations, etc.

Meanwhile, examples of suitable carriers, excipients, and diluents may include lactose, dextrose, sucrose, sorbitol, mannitol, xylitol, erythritol, maltitol, starch, acacia rubber, alginate, gelatin, calcium phosphate, calcium silicate, cellulose, methyl cellulose, microcrystalline cellulose, polyvinylpyrrolidone, water, methyl hydroxybenzoate, propyl hydroxybenzoate, talc, magnesium stearate, mineral oil, etc.

Additionally, the composition may further contain a filler, an anti-coagulant, a lubricant, a humectant, a flavoring agent, a preservative, etc.

Additionally, the enzyme fusion protein may be used by mixing with various pharmaceutically acceptable carriers approved as pharmaceutical drugs such as physiological saline or organic solvents. For increasing stability or absorptivity, carbohydrates such as glucose, sucrose, or dextrans, and antioxidants such as ascorbic acid and glutathione, chelating agents, low molecular weight proteins, or other stabilizers may be used as pharmaceutical drugs.

The pharmaceutical composition may contain the above ingredients (active ingredients) in an amount of 0.01% to 99% (w/v), but the amount is not limited thereto.

Still another aspect of the present invention provides a polynucleotide encoding the enzyme fusion protein according to the present invention.

The polynucleotide encoding the enzyme fusion protein according to the present invention may be a polynucleotide in a form where a part encoding a therapeutic enzyme and a part encoding a peptide linker-immunoglobulin Fc region is linked, and specifically, a polynucleotide encoding a fusion protein where the N-terminus of an immunoglobulin Fc region is linked to the C-terminus of a therapeutic enzyme through a GGGGS (SEQ ID NO: 16) linker, but the polynucleotide is not limited thereto. More specifically, the polynucleotide of the present invention may include the sequence of SEQ ID NO: 12, but the sequence is not limited thereto as long as the polynucleotide can encode the fusion protein between a therapeutic enzyme and an immunoglobulin Fc region.

Still another aspect of the present invention provides a recombinant expression vector including the polynucleotide.

As used herein, the term "recombinant vector" refers to a DNA construct where a target peptide (e.g., enzyme fusion protein) is operably linked to an appropriate control sequence to enable the expression of the target peptide (e.g., enzyme fusion protein) in an appropriate host. The recombinant vector according to the present invention may be constructed as a vector for typical cloning or as a vector for expression, and may be constructed using a prokaryotic cell or eukaryotic cell as a host cell.

The control sequence includes a promoter capable of initiating transcription, any operator sequence for the control of the transcription, a sequence encoding an appropriate mRNA ribosome-binding domain, and a sequence controlling the termination of transcription and translation. The recombinant vector, after being transformed into a suitable host cell, may be replicated or function irrespective of the host genome, or may be integrated into the host genome itself.

The recombinant vector used in the present invention may not be particularly limited as long as the vector is able to replicate in a host cell, and it may be constructed using any vector known in the art. Examples of the vector may include natural or recombinant plasmids, cosmids, viruses, and bacteriophages. The vector that can be used in the present invention is not particularly limited but any known expression vector may be used.

The recombinant vector is used for the transformation of a host cell for producing the enzyme fusion protein of the present invention. Additionally, these transformed cells, as a part of the present invention, may be used for the amplification of nucleic acid fragments and vectors, or they may be cultured cells or cell lines used in the recombinant production of the enzyme fusion protein of the present invention.

As used herein, the term "transformation" refers to a process of introducing a recombinant vector including a polynucleotide encoding a target protein (e.g., therapeutic enzyme, enzyme fusion protein) into a host cell, thereby enabling the expression of the protein encoded by the polynucleotide in the host cell. For the transformed polynucleotide, it does not matter whether it is inserted into the chromosome of a host cell and located therein or located outside the chromosome, as long as it can be expressed in the host cell, and both cases are included.

Additionally, the polynucleotide includes DNA and RNA which encode the target protein. The polynucleotide may be inserted in any form as long as it can be introduced into a host cell and expressed therein. For example, the polynucleotide may be introduced into a host cell in the form of an expression cassette, which is a gene construct including all essential elements required for self-expression. The expression cassette may conventionally include a promoter operably linked to the polynucleotide, a transcription termination signal, a ribosome-binding domain, and a translation termination signal. The expression cassette may be in the form of an expression vector capable of self-replication. Additionally, the polynucleotide may be introduced into a host cell as is and operably linked to a sequence essential for its expression in the host cell, but the polynucleotide is not limited thereto.

Additionally, as used herein, the term "operably linked" refers to a functional linkage between a promoter sequence, which initiates and mediates the transcription of the polynucleotide encoding the target peptide of the present invention, and the above gene sequence.

An appropriate host to be used in the present invention may not be particularly limited as long as it can express the polynucleotide of the present invention. Examples of the appropriate host may include bacteria belonging to the genus *Escherichia* such as *E. coli*; bacteria belonging to the genus *Bacillus* such as *Bacillus subtilis*; bacteria belonging to the genus *Pseudomonas* such as *Pseudomonas putida*; yeasts such as *Pichia pastoris, Saccharomyces cerevisiae,* and *Schizosaccharomyces pombe*; insect cells such as *Spodoptera frugiperda* (Sf9); and animal cells such as CHO, COS, BSC, etc.

Still another aspect of the present invention provides a transformant into which the expression vector is introduced.

For the purpose of the present invention, the transformant into which the expression vector of the present invention is introduced may not be limited as long as the transformant can express and produce the enzyme fusion protein, but the transformant may be bacteria belonging to the genus *Escherichia* such as *E. coli*; bacteria belonging to the genus *Bacillus* such as *Bacillus subtilis*; bacteria belonging to the genus *Pseudomonas* such as *Pseudomonas putida*; yeasts such as *Pichia pastoris, Saccharomyces cerevisiae,* and *Schizosaccharomyces pombe*; insect cells such as *Spodoptera frugiperda* (Sf9); and animal cells such as CHO, COS, BSC, etc.

Still another aspect of the present invention provides a method for preparing the enzyme fusion protein according to the present invention.

Specifically, the method may include (a) culturing a transformant to obtain a culture; and
(b) recovering an enzyme fusion protein from the culture, but the method is not limited thereto.

In the present invention, the medium used in culturing the transformant must meet the requirements for host cell cultivation in an appropriate manner. The carbon sources that may be contained in the medium for the growth of a host cell may be appropriately selected by the decision of those skilled in the art according to the type of the transformant prepared therefrom, and appropriate cultivation conditions may be selected so as to control the period and amount of cultivation.

Examples of the sugar source to be used in the medium may include sugars and carbohydrates such as glucose, saccharose, lactose, fructose, maltose, starch, and cellulose; oils and fats such as soybean oil, sunflower oil, castor oil, and coconut oil; fatty acids such as palmitic acid, stearic acid, and linoleic acid; alcohols such as glycerol and ethanol; and organic acids such as acetic acid. These materials may be used alone or in combination.

Examples of the nitrogen source to be used may include peptone, yeast extract, meat gravy, malt extract, corn steep liquor, soybean flour, and urea, or inorganic compounds such as ammonium sulfate, ammonium chloride, ammonium phosphate, ammonium carbonate, and ammonium nitrate. The nitrogen source may also be used alone or in combination.

Examples of the phosphorous source to be used may include potassium dihydrogen phosphate or dipotassium hydrogen phosphate or a corresponding sodium-containing salt. Additionally, the culture medium may contain a metal salt such as magnesium sulfate or iron sulfate necessary for growth.

Lastly, essential growth materials such as amino acids and vitamins may be used. Additionally, appropriate precursors for culture medium may also be used. The above sources may be appropriately added to a culture during cultivation by a batch culture or continuous culture. The pH of the culture may be appropriately adjusted using a basic compound such as sodium hydroxide, potassium hydroxide, and ammonia, or an acidic compound such as phosphoric acid or sulfuric acid. Additionally, an antifoaming agent such as fatty acid polyglycol ester may be added to prevent foam generation. Additionally, in order to maintain the aerobic state of the culture, oxygen or an oxygen-containing gas (e.g., air) may be injected into the culture.

The transformant of the present invention may be cultured at 20° C. to 45° C., and specifically, 25° C. to 40° C. Additionally, the cultivation is continued until the maximum amount of production of the desired therapeutic enzyme or enzyme fusion protein is obtained, and in this regard, the cultivation may normally be continued for 10 hours to 160 hours.

As described above, the transformant of the present invention can produce the therapeutic enzyme or enzyme fusion protein when appropriate culture conditions are provided according to a host cell, and the therapeutic enzyme or enzyme fusion protein produced according to the vector constitution and characteristics of a host cell may be secreted within the cytoplasm or into the periplasmic space of the host cell or extracellularly.

The proteins expressed within or outside of the host cell may be purified by a conventional method. Examples of the purification method may include salting-out (e.g., ammonium sulfate precipitation, sodium phosphate precipitation, etc.), solvent precipitation (e.g., protein fraction precipitation using acetone or ethanol, etc.), dialysis, gel filtration, ion exchange, or chromatography such as reversed column chromatography, ultrafiltration, etc., and these methods may be used alone or in combination.

Still another aspect of the present invention provides a method which includes administering the enzyme fusion protein or a composition for the prevention or treatment of an LSD containing the enzyme fusion protein to a subject.

Since the enzyme fusion protein of the present invention contains a therapeutic enzyme which can prevent or treat an LSD, the LSD may be prevented or treated by the administration of an enzyme fusion protein containing the therapeutic enzyme or a pharmaceutical composition containing the enzyme fusion protein to a subject suspected of having the LSD.

As used herein, the term "subject" refers to a subject suspected of having an LSD, and the subject suspected of having an LSD refers to mammals including humans, rats, cattle, etc. which have or are at risk of developing the LSD, but any subject which can be treated with the enzyme fusion protein of the present invention or composition containing the enzyme fusion protein is included without limitation.

The method of the present invention may include administering a pharmaceutically effective amount of the pharmaceutical composition containing an enzyme fusion protein. An appropriate total daily dose of the composition may be determined within the scope of correct medical judgment by a practitioner, and the composition may be administered once or several times in divided doses per day. However, for the purpose of the present invention, preferably, the specific therapeutically effective dose of the composition for any particular patient is applied differently depending on various factors including the kind and degree of responses to be achieved, specific compositions including whether other agents are occasionally used therewith, the patient's age, weight, health conditions, sex and diet, administration time, administration route, excretion rate of the composition, duration of treatment, other drugs used in combination or simultaneously with the specific compositions, and similar factors well known in the medical field.

Meanwhile, the method for the prevention or treatment of the LSDs may be a combination therapy which further includes administering a compound or material having a therapeutic effect for at least one of the LSDs, but the method is not limited thereto.

As used herein, the term "combination" must be understood as referring to a simultaneous, separate, or sequential administration. When the administration is sequential or separate, the interval allowed for the administration of a second ingredient must be one which should not lose the advantageous effects of the combination.

The administration dose of the enzyme fusion protein having a therapeutic activity for the LSD may be about 0.0001 μg to 500 mg per 1 kg of body weight of a patient, but the dose is not particularly limited.

Still another aspect of the present invention provides a use of the enzyme fusion protein, or a composition containing the enzyme fusion protein in the preparation of a medicament (or a pharmaceutical composition) for the prevention or treatment of LSDs.

Hereinafter, the present invention will be described in more detail with reference to the following Examples. However, these Examples are for illustrative purposes only and the scope of the invention is not limited by these Examples.

Example 1: Preparation of Enzyme Fusion Protein

For the production of an enzyme fusion protein including a therapeutic enzyme in the form of an anti-parallel dimer, the present inventors have fused native alpha-galactosidase, a linker (SEQ ID NO: 10), and an Fc immunoglobulin region (SEQ ID NO: 7) at the gene level, and have inserted the fused product into an expression vector.

To remove the sites for chain exchange and N-glycosylation in the Fc regions of the constructed fusion protein, a site-directed mutagenesis PCR technique was used.

Specifically, the $2^{nd}$ amino acid of the Fc region (i.e., serine) involved in the chain exchange was substituted with proline using the primers (SEQ ID NOS: 1 and 2), and the $71^{st}$ amino acid of the Fc region (i.e., asparagine) involved in the N-glycosylation was substituted with glutamine using the primers (SEQ ID NOS: 3 and 4) from a Fc region (SEQ ID NO:8).

TABLE 1

Primers for mutagenesis

| Primer | Sequence | SEQ ID NO |
|---|---|---|
| Fc(S2P)_F | 5'- CTGGCGGTGGCGGATCGCCACCATGCCCAGCACCTGAGTTCCT-3' | 1 |
| Fc(S2P)_R | 5'- AGGAACTCAGGTGCTGGGCATGGTGGCGATCCGCCACCGCCAG-3' | 2 |
| Fc(N71Q)_F | 5'- AGCCGCGGGAGGAGCAGTTCCAAAGCACGTACCGTGTGGTCAG-3' | 3 |
| Fc(N71Q)_R | 5'- CTGACCACACGGTACGTGCTTTGGAACTGCTCCTCCCGCGGCT-3' | 4 |

The polynucleotide encoding the synthesized alpha-galactosidase-Fc fusion protein was inserted into an expression vector (the XOGC vector) using restriction enzymes. Both BamHI and XhoI are restriction enzymes that do not cleave alpha-galactosidase and Fc immunoglobulin regions. The alpha-galactosidase-Fc cleaved with the above restriction enzymes was inserted into the XOGC vector cleaved with the same restriction enzymes, and thereby a vector capable of expressing an alpha-galactosidase-Fc fusion protein was completed. The alpha-galactosidase forms an anti-parallel dimer when immunoglobulin Fc regions form a dimer.

The DNA and protein sequences of alpha-galactosidase-Fc are shown in Table 2 below, in which the underlined parts represent a signal sequence, the bold parts represent substituted amino acids, and the italic parts represent linkers.

TABLE 2

DNA sequence and protein sequence of enzyme fusion protein

| Name | | Sequence | SEQ ID NO |
|---|---|---|---|
| alpha-Galacto-sidase-Fc | DNA | ATGCAGCTGA GGAACCCAGA ACTACATCTG GGCTGCGCGC TTGCGCTTCG CTTCCTGGCC CTCGTTTCCT GGGACATCCC TGGGGCTAGA GCACTGGACA ATGGATTGGC AAGGACGCCT ACCATGGGCT GGCTGCACTG GGAGCGCTTC ATGTGCAACC TTGACTGCCA GGAAGAGCCA GATTCCTGCA TCAGTGAGAA GCTCTTCATG GAGATGGCAG AGCTCATGGT CTCAGAAGGC TGGAAGGATG CAGGTTATGA GTACCTCTGC ATTGATGACT GTTGGATGGC TCCCCAAAGA GATTCAGAAG GCAGACTTCA GGCAGACCCT CAGCGCTTTC CTCATGGGAT TCGCCAGCTA GCTAATTATG TTCACAGCAA AGGACTGAAG CTAGGGATTT ATGCAGATGT TGGAAATAAA ACCTGCGCAG GCTTCCCTGG GAGTTTTGGA TACTACGACA TTGATGCCCA GACCTTTGCT GACTGGGAG TAGATCTGCT AAAATTTGAT GGTTGTTACT GTGACAGTTT GGAAAATTTG GCAGATGGTT ATAAGCACAT GTCCTTGGCC CTGAATAGGA CTGGCAGAAG CATTGTGTAC TCCTGTGAGT GGCCTCTTTA TATGTGGCCC TTTCAAAAGC CCAATTATAC AGAAATCCGA CAGTACTGCA ATCACTGGCG AAATTTTGCT GACATTGATG ATTCCTGGAA AAGTATAAAG AGTATCTTGG ACTGGACATC TTTTAACCAG GAGAGAATTG TTGATGTTGC TGGACCAGGG GGTTGGAATG ACCCAGATAT GTTAGTGATT GGCAACTTTG GCCTCAGCTG GAATCAGCAA GTAACTCAGA TGGCCCTCTG GGCTATCATG GCTGCTCCTT TATTCATGTC TAATGACCTC CGACACATCA GCCCTCAAGC CAAAGCTCTC CTTCAGGATA AGGACGTAAT TGCCATCAAT CAGGACCCCT TGGGCAAGCA AGGGTACCAG CTTAGACAGG GAGACAACTT TGAAGTGTGG GAACGACCTC TCTCAGGCTT AGCCTGGGCT GTAGCTATGA TAAACCGGCA GGAGATTGGT GGACCTCGCT CTTATACCAT CGCAGTTGCT TCCCTGGGTA AAGGAGTGGC CTGTAATCCT GCCTGCTTCA TCACACAGCT CCTCCCTGTG AAAAGGAAGC TAGGGTTCTA TGAATGGACT TCAAGGTTAA GAAGTCACAT AAATCCCACA GGCACTGTTT TGCTTCAGCT AGAAAATACA ATGCAGATGT CATTAAAAGA CTTACTT*GGC GGCGGAGGTT CAGGTGGTGG TGGCTCTGGC GGTGGAGGGT CGGGGGGAGG CGGCTCTGGA GGAGGGGGCT CCGGTGGGGG AGGTAGCCCA* CCATGCCCAG CACCTGAGTT CCTGGGGGGA CCATCAGTCT TCCTGTTCCC CCCAAAACCC AAGGACACCC TCATGATCTC CCGGACCCCT GAGGTCACAT GCGTGGTGGT GGACGTGAGC CAGGAAGACC CTGAGGTCCA GTTCAACTGG TACGTGGACG GCGTGGAGGT GCATAATGCC AAGACAAAGC CGCGGGAGGA GCAGTTCCAA AGCACGTACC GTGTGGTCAG CGTCCTCACC GTCCTGCACC AGGACTGGCT GAATGGCAAG GAGTACAAGT GCAAGGTCTC CAACAAAGGC CTCCCATCCT CCATCGAGAA AACCATCTCC AAAGCCAAAG GGCAGCCCCG AGAACCACAG GTGTACACCC TGCCCCCATC CCAGGAGGAG ATGACCAAGA ACCAGGTCAG CCTGACCTGC CTGGTCAAAG GCTTCTATCC CAGCGACATC GCCGTGGAGT GGGAGAGCAA TGGGCAGCCG GAGAACAACT ACAAGACCAC GCCTCCCGTG CTGGACTCCG ACGGCTCCTT CTTCCTCTAC AGCAGGCTAA CCGTGGACAA GAGCAGGTGG CAGGAGGGGA ACGTCTTCTC ATGCTCCGTG ATGCATGAGG CTCTGCACAA CCACTACACG CAGAAGAGCC TCTCCCTGTC TCTGGGTAAA TGA | 12 |

TABLE 2-continued

DNA sequence and protein sequence of enzyme fusion protein

| Name | Sequence | SEQ ID NO |
|---|---|---|
| Protein | MQLRNPELHL GCALALRFLA LVSWDIPGAR ALDNGLARTP TMGWLHWERF MCNLDCQEEP DSCISEKLFM EMAELMVSEG WKDAGYEYLC IDDCWMAPQR DSEGRLQADP QRFPHGIRQL ANYVHSKGLK LGIYADVGNK TCAGFPGSFG YYDIDAQTFA DWGVDLLKFD GCYCDSLENL ADGYKHMSLA LNRTGRSIVY SCEWPLYMWP FQKPNYTEIR QYCNHWRNFA DIDDSWKSIK SILDWTSFNQ ERIVDVAGPG GWNDPDMLVI GNFGLSWNQQ VTQMALWAIM AAPLFMSNDL RHISPQAKAL LQDKDVIAIN QDPLGKQGYQ LRQGDNFEVW ERPLSGLAWA VAMINRQEIG GPRSYTIAVA SLGKGVACNP ACFITQLLPV KRKLGFYEWT SRLRSHINPT GTVLLQLENT MQMSLKDLLG *GGGSGGGGSG GGGSGGGGSG GGGSGGGGSP* PCPAPEFLGG PSVFLFPPKP KDTLMISRTP EVTCVVVDVS QEDPEVQFNW YVDGVEVHNA KTKPREEQFQ STYRVVSVLT VLHQDWLNGK EYKCKVSNKG LPSSIEKTIS KAKGQPREPQ VYTLPPSQEE MTKNQVSLTC LVKGFYPSDI AVEWESNGQP ENNYKTTPPV LDSDGSFFLY SRLTVDKSRW QEGNVFSCSV MHEALHNHYT QKSLSLSLGK | 13 |

The enzyme fusion protein an expression vector prepared in Example 1 was named as alpha-galactosidase-Fc.

Example 2: Confirmation of In Vitro Enzyme Activity of Enzyme Fusion Protein

Example 2-1: Preparation of Alpha-Galactosidase-Fc Fusion Protein

The alpha-galactosidase-Fc expression vector (pXOGC-alpha galactosidase-Fc) prepared in Example 1 was transformed into the CHO-S cell line and thereby a cell line capable of mass production of an alpha-galactosidase-Fc fusion protein was prepared.

Specifically, CHO-S cells were allowed to proliferate by suspension culture in a 1 L Erlenmeyer flask (Corning Inc., Cat. No. 431147) using a serum-free medium (FreeStyle™ CHO Expression Medium, Thermo Fisher Scientific, Cat. No. 12651014). When the cells within a culture container reached a confluency of 5×10$^8$ cells, they were transformed using the FreeStyle™ MAX (Thermo Fisher Scientific, Cat. No. 16447-100). That is, each of two tubes was independently charged with 10 mL OptiPro™ SFM (Thermo Fisher Scientific, Cat. No. 12309-019), and then, one tube was charged with 500 μg of DNA and the other tube was charged with 500 μL of FreeStyle™ MAX. The two solutions in each tube were mixed, placed at room temperature for 10 minutes, and added into the cells in which the medium was replaced in advance with a fresh FreeStyle™ CHO expression medium (Thermo Fisher Scientific, Cat. No. 12651014), respectively. The cells were cultured in an incubator (37° C., 5% CO$_2$) at a revolution rate of 125 rpm for about 96 hours.

Then, the supernatant of the culture was recovered by centrifugation on the 4$^{th}$ day, and the in vitro enzyme activity was measured so as to examine the changes in enzyme activity according to the production of alpha-galactosidase-Fc.

Example 2-2: Confirmation of In Vitro Enzyme Activity of Alpha-Galactosidase-Fc To examine the in vitro enzyme activity of alpha-galactosidase-Fc, the produced alpha-galactosidase-Fc fusion protein was allowed to establish a temperature equilibrium with pNP-gal (p-nitrophenyl-α-D-galactopyranoside), a known substrate for enzymes, at 37° C. for 30 minutes. Then, the substrate solution was reacted with alpha-galactosidase-Fc at 37° C. for 30 minutes and the absorbance of the resultant was measured so as to measure the in vitro enzyme activity of alpha-galactosidase-Fc.

As a result, from the in vitro enzyme activity measurement, it was confirmed that the expression level of alpha-galactosidase-Fc was 1,649 ng/mL (FIG. 1). These results suggest that the alpha-galactosidase of the enzyme fusion protein of the present invention forms an anti-parallel dimer and that the alpha-galactosidase of the anti-parallel dimer maintains the enzyme activity at a significant level.

Example 2-3: Comparison of In Vitro Enzyme Activity Between Alpha-Galactosidase and Alpha-Galactosidase-Fc Meanwhile, the in vitro enzyme activity of the alpha-galactosidase-Fc fusion protein prepared in Example 1 was compared to that of the agalsidase-beta, to which an Fc region was not linked.

Specifically, alpha-galactosidase-Fc and agalsidase-beta were allowed to establish a temperature equilibrium with pNP-gal (p-nitrophenyl-α-D-galactopyranoside), a substrate for enzymes, at 37° C. for 30 minutes. Then, the substrate solution was reacted with the alpha-galactosidase-Fc fusion protein at 37° C. for 20 minutes. Then, the absorbance of the finally produced 4-nitrophenol was measured so as to compare the enzyme activity between alpha-galactosidase-Fc and the agalsidase-beta.

As a result, it was confirmed that the enzyme activity (specific activity) of alpha-galactosidase-Fc and the agalsidase-beta were 70.9 μmol/min/mg and 67.6 μmol/min/mg, respectively (FIG. 2). From these results, it was confirmed that the alpha-galactosidase-Fc fusion protein had enzyme activity of 95.4%, which is a level similar to that of the enzyme to which an Fc region was not linked. This means that the alpha-galactosidase-Fc fusion protein of the present invention did not lose its enzyme activity even when an Fc region was linked thereto.

Example 3: Confirmation of In Vitro Intracellular Absorption Activity of Alpha-Galactosidase-Fc It is known that alpha-galactosidase acts through mannose-6-phosphate receptors (M6PR) after being absorbed into cells. Therefore, the present inventors have confirmed the cellular absorption activity exhibited by the alpha-galactosidase-Fc fusion protein as follows.

Specifically, the CCD986SK cells (human skin fibroblasts), which are known to express M6PR, were treated with each of the agalsidase-beta and the alpha-galactosidase-Fc fusion protein, and the intracellular absorption was induced at 37° C. After 24 hours, the presence of the agalsidase-beta and the alpha-galactosidase-Fc fusion protein was confirmed by an enzyme activity measurement method.

Specifically, based on the agalsidase, the agalsidase-beta (control group) and the alpha-galactosidase-Fc fusion protein (test group) were administered to the ICR mice of the control group and the experimental group, respectively, by intravenous and subcutaneous injections at a concentration of 1.0 mg/kg. Blood samples were collected from the group administered by intravenous injection at 0, 0.25, 0.5, 0.75, 1, 1.25, 1.5, 1.75, 2, and 4 hours after the injection, and from the group administered by subcutaneous injection at 0, 1, 4, 8, 24, 48, 72, %, 120, 144, 168, 192, and 216 hours after the injection. The amounts of proteins in the blood serum were quantified through the measurement of in vitro enzyme activity.

As a result, the alpha-galactosidase-Fc fusion protein showed an increase in all of the half-life ($T_{1/2}$), maximum drug concentration in blood ($C_{max}$), and area under curve (AUC), compared to the control group to which an Fc region was not linked. The AUC represent the level of in vivo exposure to drug molecules (FIG. 4, Table 3). From these results, it was confirmed that the alpha-galactosidase-Fc fusion protein of the present invention, regardless of the administration route, shows a high blood half-life, maximum drug concentration in blood ($C_{max}$), and in vivo bioavailability (AUC), due to the linkage to an Fc region.

TABLE 3

Pharmacodynamic parameters of agalsidase-beta and alpha-galactosidase-Fc fusion proteins

| Material | Administration Route | $AUC_{last}$ (ng*hr/mL) | $C_{max}$ (ng/mL) | $T_{1/2}$ (hr) | $MRT_{last}$ (hr) |
| --- | --- | --- | --- | --- | --- |
| Agalsidase-beta | Intravenous | 798.4 | 5108.5 | NA | 0.2 |
| alpha-Galactosidase-Fc fusion protein | Intravenous | 74553.6 | 2908.9 | 60.8 | 42.0 |
| alpha-Galactosidase-Fc fusion protein | Subcutaneous | 59017.1 | 706.6 | 58.2 | 57.5 |

*NA = Not Applicable

As a result of the analysis of the correlation between the concentration of the alpha-galactosidase-Fc fusion protein and its intracellular absorption, it was found that the $K_m$ value, which is a Michaelis-Menten constant that represents a half of the maximum absorption rate, was 11.55 nM, thus showing a similar level of intracellular absorption activity to the agalsidase-beta ($K_m$=10.92 nM) (FIG. 3). From these results, it was confirmed that the alpha-galactosidase-Fc fusion protein of the present invention did not lose its intracellular absorption activity even when an Fc region was linked thereto.

Example 5: Confirmation of Pharmacodynamic Behavior of Alpha-Galactosidase-Fc Fusion Protein in ICR Mice The stability in blood and pharmacokinetic coefficients of the agalsidase-beta (control group) and the alpha-galactosidase-Fc fusion protein (test group), which was prepared in Example, per blood sample collection according to each group were compared in ICR mice (3 mice/group), per each time point of blood sample collection.

These results suggest that the novel type of fusion protein of the present invention, which is capable of increasing the half-life and in vivo bioavailability of alpha-galactosidase (i.e., an example of those therapeutic enzymes that are known to have a therapeutic effect on LSDs), can be used as a therapeutic agent for LSDs while being capable of maintaining the enzyme activity.

From the foregoing, a skilled person in the art to which the present invention pertains will be able to understand that the present invention may be embodied in other specific forms without modifying the technical concepts or essential characteristics of the present invention. In this regard, the exemplary embodiments disclosed herein are only for illustrative purposes and should not be construed as limiting the scope of the present invention. On the contrary, the present invention is intended to cover not only the exemplary embodiments but also various alternatives, modifications, equivalents, and other embodiments that may be included within the spirit and scope of the present invention as defined by the appended claims.

The invention claimed is:

1. An enzyme fusion protein of the following Formula 1:

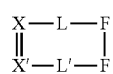

Formula 1 wherein X and X' are the same each other and each independently an enzyme and the enzyme forms a dimer through a non-covalent bond;

L and L' are the same or different from each other, and are a peptide linker consisting of 10 to 50 amino acid residues;

F is an immunoglobulin Fc region obtained from immunoglobulin G4 (IgG4) and the immunoglobulin Fc region is in a monomer form;

| is a covalent bond; and

: is a non-covalent bond, wherein the enzyme is selected from the group consisting of beta-glucosidase, alpha-galactosidase, beta-galactosidase, iduronidase, iduronate-2-sulfatase, galactose-6-sulfatase, acid alpha-glucosidase, acid ceramidase, acid sphingomyelinase, galactocerebrosidase, arylsulfatase A, B, beta-hexosaminidase A, B, heparin N-sulfatase, alpha-D-mannosidase, beta-glucuronidase, N-acetylgalactosamine-6 sulfatase, lysosomal acid lipase, alpha-N-acetyl-glucosaminidase, glucocerebrosidase, butyrylcholinesterase, chitinase, glutamate decarboxylase, imiglucerase, lipase, uricase, platelet-activating factor acetylhydrolase, neutral endopeptidase, and myeloperoxidase, wherein the immunoglobulin Fc region comprises the amino acid sequence of SEQ ID NO: 8, wherein serine at position 2 is substituted with proline; or asparagine at position 71 is substituted with glutamine; or serine at position 2 is substituted with proline and asparagine at position 71 is substituted with glutamine.

2. The enzyme fusion protein of claim 1, wherein the enzyme X and X' form a dimer in anti-parallel configuration with each other.

3. The enzyme fusion protein of claim 1, wherein the enzyme fusion protein has increased stability and reduced binding affinity for lysosome receptors, compared to an enzyme to which an immunoglobulin Fc region is not fused.

4. The enzyme fusion protein of claim 1, wherein the enzyme is alpha-galactosidase A or beta-galactosidase.

5. The enzyme fusion protein of claim 1, wherein no chain exchange occurs in the immunoglobulin Fc region.

6. The enzyme fusion protein of claim 1, wherein the immunoglobulin Fc region is aglycosylated.

7. The enzyme fusion protein of claim 1, wherein the enzyme comprises the amino acid sequence of SEQ ID NO: 6.

8. The enzyme fusion protein of claim 1, wherein the enzyme fusion protein comprises the amino acid sequence of SEQ ID NO: 13.

* * * * *

SEQUENCE LISTING

<160> NUMBER OF SEQ ID NOS: 16

<210> SEQ ID NO 1
<211> LENGTH: 43
<212> TYPE: DNA
<213> ORGANISM: Artificial Sequence
<220> FEATURE:
<223> OTHER INFORMATION: Fc(S2P)_F

<400> SEQUENCE: 1
ctggcggtgg cggatcgcca ccatgcccag cacctgagtt cct                43

<210> SEQ ID NO 2
<211> LENGTH: 43
<212> TYPE: DNA
<213> ORGANISM: Artificial Sequence
<220> FEATURE:
<223> OTHER INFORMATION: Fc(S2P)_R

<400> SEQUENCE: 2
aggaactcag gtgctgggca tggtggcgat ccgccaccgc cag                43

<210> SEQ ID NO 3
<211> LENGTH: 43
<212> TYPE: DNA
<213> ORGANISM: Artificial Sequence
<220> FEATURE:
<223> OTHER INFORMATION: Fc(N71Q)_F

<400> SEQUENCE: 3
agccgcggga ggagcagttc caaagcacgt accgtgtggt cag                43

<210> SEQ ID NO 4
<211> LENGTH: 43
<212> TYPE: DNA
<213> ORGANISM: Artificial Sequence
<220> FEATURE:
<223> OTHER INFORMATION: Fc(N71Q)_R

<400> SEQUENCE: 4
ctgaccacac ggtacgtgct ttggaactgc tcctcccgcg gct                43

<210> SEQ ID NO 5
<211> LENGTH: 1287
<212> TYPE: DNA
<213> ORGANISM: Homo sapiens

<400> SEQUENCE: 5
atgcagctga ggaacccaga actacatctg ggctgcgcgc ttgcgcttcg cttcctggcc      60
ctcgtttcct gggacatccc tggggctaga gcactggaca tggattggc aaggacgcct      120
accatgggct ggctgcactg ggagcgcttc atgtgcaacc ttgactgcca ggaagagcca      180
gattcctgca tcagtgagaa gctcttcatg gagatggcag agctcatggt ctcagaaggc      240
tggaaggatg caggttatga gtacctctgc attgatgact gttggatggc tccccaaaga      300
gattcagaag gcagacttca ggcagaccct cagcgctttc ctcatgggat cgccagcta      360
gctaattatg ttcacagcaa aggactgaag ctagggattt atgcagatgt tggaaataaa      420
acctgcgcag gcttccctgg gagttttgga tactacgaca ttgatgccca gacctttgct      480
gactggggag tagatctgct aaaatttgat ggttgttact gtgacagttt ggaaaatttg      540
gcagatggtt ataagcacat gtccttggcc ctgaatagga ctgcagaag cattgtgtac      600
tcctgtgagt ggcctcttta tatgtggccc tttcaaaagc ccaattatac agaaatccga      660

```
cagtactgca atcactggcg aaattttgct gacattgatg attcctggaa aagtataaag      720
agtatcttgg actggacatc ttttaaccag gagagaattt tgatgttgc tggaccaggg       780 ggttggaatg acccagatat gttagtgatt ggcaactttg gcctcagctg aatcagcaa       840 gtaactcaga tggccctctg gctatcatg gctgctcctt tattcatgtc taatgacctc       900
cgacacatca gccctcaagc caaagctctc cttcaggata aggacgtaat tgccatcaat      960 caggaccct tgggcaagca agggtaccag cttagacagg gagacaactt tgaagtgtgg      1020
gaacgacctc tctcaggctt agcctgggct gtagctatga taaaccggca ggagattggt      1080
ggacctcgct cttataccat cgcagttgct tccctgggta aaggagtggc ctgtaatcct      1140
gcctgcttca tcacacagct cctccctgtg aaaaggaagc tagggttcta tgaatggact      1200
tcaaggttaa gaagtcacat aaatcccaca ggcactgttt tgcttcagct agaaaataca      1260
atgcagatgt cattaaaaga cttactt                                         1287
```

<210> SEQ ID NO 6
<211> LENGTH: 429
<212> TYPE: PRT
<213> ORGANISM: Homo sapiens
<400> SEQUENCE: 6

```
Met Gln Leu Arg Asn Pro Glu Leu His Leu Gly Cys Ala Leu Ala Leu
1               5                   10                  15

Arg Phe Leu Ala Leu Val Ser Trp Asp Ile Pro Gly Ala Arg Ala Leu
                20                  25                  30

Asp Asn Gly Leu Ala Arg Thr Pro Thr Met Gly Trp Leu His Trp Glu
            35                  40                  45

Arg Phe Met Cys Asn Leu Asp Cys Gln Glu Glu Pro Asp Ser Cys Ile
        50                  55                  60

Ser Glu Lys Leu Phe Met Glu Met Ala Glu Leu Met Val Ser Glu Gly
65                  70                  75                  80

Trp Lys Asp Ala Gly Tyr Glu Tyr Leu Cys Ile Asp Asp Cys Trp Met
                85                  90                  95

Ala Pro Gln Arg Asp Ser Glu Gly Arg Leu Gln Ala Asp Pro Gln Arg
            100                 105                 110

Phe Pro His Gly Ile Arg Gln Leu Ala Asn Tyr Val His Ser Lys Gly
        115                 120                 125

Leu Lys Leu Gly Ile Tyr Ala Asp Val Gly Asn Lys Thr Cys Ala Gly
    130                 135                 140

Phe Pro Gly Ser Phe Gly Tyr Tyr Asp Ile Asp Ala Gln Thr Phe Ala
145                 150                 155                 160

Asp Trp Gly Val Asp Leu Leu Lys Phe Asp Gly Cys Tyr Cys Asp Ser
                165                 170                 175

Leu Glu Asn Leu Ala Asp Gly Tyr Lys His Met Ser Leu Ala Leu Asn
            180                 185                 190

Arg Thr Gly Arg Ser Ile Val Tyr Ser Cys Glu Trp Pro Leu Tyr Met
        195                 200                 205

Trp Pro Phe Gln Lys Pro Asn Tyr Thr Glu Ile Arg Gln Tyr Cys Asn
    210                 215                 220

His Trp Arg Asn Phe Ala Asp Ile Asp Asp Ser Trp Lys Ser Ile Lys
225                 230                 235                 240

Ser Ile Leu Asp Trp Thr Ser Phe Asn Gln Glu Arg Ile Val Asp Val
                245                 250                 255
```

Ala Gly Pro Gly Gly Trp Asn Asp Pro Asp Met Leu Val Ile Gly Asn
              260                 265                 270

Phe Gly Leu Ser Trp Asn Gln Gln Val Thr Gln Met Ala Leu Trp Ala
          275                 280                 285

Ile Met Ala Ala Pro Leu Phe Met Ser Asn Asp Leu Arg His Ile Ser
      290                 295                 300

Pro Gln Ala Lys Ala Leu Leu Gln Asp Lys Asp Val Ile Ala Ile Asn
305                 310                 315                 320

Gln Asp Pro Leu Gly Lys Gln Gly Tyr Gln Leu Arg Gln Gly Asp Asn
                325                 330                 335

Phe Glu Val Trp Glu Arg Pro Leu Ser Gly Leu Ala Trp Ala Val Ala
              340                 345                 350

Met Ile Asn Arg Gln Glu Ile Gly Gly Pro Arg Ser Tyr Thr Ile Ala
          355                 360                 365

Val Ala Ser Leu Gly Lys Gly Val Ala Cys Asn Pro Ala Cys Phe Ile
      370                 375                 380

Thr Gln Leu Leu Pro Val Lys Arg Lys Leu Gly Phe Tyr Glu Trp Thr
385                 390                 395                 400

Ser Arg Leu Arg Ser His Ile Asn Pro Thr Gly Thr Val Leu Leu Gln
                405                 410                 415

Leu Glu Asn Thr Met Gln Met Ser Leu Lys Asp Leu Leu
              420                 425

<210> SEQ ID NO 7
<211> LENGTH: 666
<212> TYPE: DNA
<213> ORGANISM: Artificial Sequence
<220> FEATURE:
<223> OTHER INFORMATION: Fc varinat

<400> SEQUENCE: 7
ccaccatgcc cagcacctga gttcctgggg ggaccatcag tcttcctgtt cccccccaaaa      60 cccaaggaca ccctcatgat ctcccggacc cctgaggtca catgcgtggt ggtggacgtg     120
agccaggaag accctgaggt ccagttcaac tggtacgtgg acggcgtgga ggtgcataat     180
gccaagacaa agccgcggga ggagcagttc aaaagcacgt accgtgtggt cagcgtcctc     240
accgtcctgc accaggactg gctgaatggc aaggagtaca agtgcaaggt ctccaacaaa     300
ggcctcccat cctccatcga gaaaaccatc tccaaagcca agggcagccc cgagaaccca     360
caggtgtaca ccctgccccc atcccaggag gagatgacca agaaccaggt cagcctgacc     420
tgcctggtca aaggcttcta tcccagcgac atcgccgtgg agtgggagag caatgggcag     480
ccggagaaca actacaagac cacgcctccc gtgctggact ccgacggctc cttcttcctc     540
tacagcaggc taaccgtgga caagagcagg tggcaggagg ggaacgtctt ctcatgctcc     600
gtgatgcatg aggctctgca caaccactac acgcagaaga gcctctccct gtctctgggt     660
aaatga                                                                 666

<210> SEQ ID NO 8
<211> LENGTH: 221
<212> TYPE: PRT
<213> ORGANISM: Artificial Sequence
<220> FEATURE:
<223> OTHER INFORMATION: Fc variant

<400> SEQUENCE: 8

Pro Ser Cys Pro Ala Pro Glu Phe Leu Gly Gly Pro Ser Val Phe Leu
1               5                   10                  15

```
Phe Pro Pro Lys Pro Lys Asp Thr Leu Met Ile Ser Arg Thr Pro Glu
                20                  25                  30

Val Thr Cys Val Val Val Asp Val Ser Gln Glu Asp Pro Glu Val Gln
         35                  40                  45

Phe Asn Trp Tyr Val Asp Gly Val Glu Val His Asn Ala Lys Thr Lys
 50                  55                  60

Pro Arg Glu Glu Gln Phe Asn Ser Thr Tyr Arg Val Val Ser Val Leu
 65                  70                  75                  80

Thr Val Leu His Gln Asp Trp Leu Asn Gly Lys Glu Tyr Lys Cys Lys
                 85                  90                  95

Val Ser Asn Lys Gly Leu Pro Ser Ser Ile Glu Lys Thr Ile Ser Lys
                100                 105                 110

Ala Lys Gly Gln Pro Arg Glu Pro Gln Val Tyr Thr Leu Pro Pro Ser
            115                 120                 125

Gln Glu Glu Met Thr Lys Asn Gln Val Ser Leu Thr Cys Leu Val Lys
130                 135                 140

Gly Phe Tyr Pro Ser Asp Ile Ala Val Glu Trp Glu Ser Asn Gly Gln
145                 150                 155                 160

Pro Glu Asn Asn Tyr Lys Thr Thr Pro Pro Val Leu Asp Ser Asp Gly
                165                 170                 175

Ser Phe Phe Leu Tyr Ser Arg Leu Thr Val Asp Lys Ser Arg Trp Gln
                180                 185                 190

Glu Gly Asn Val Phe Ser Cys Ser Val Met His Glu Ala Leu His Asn
            195                 200                 205

His Tyr Thr Gln Lys Ser Leu Ser Leu Ser Leu Gly Lys
            210                 215                 220

<210> SEQ ID NO 9
<211> LENGTH: 221
<212> TYPE: PRT
<213> ORGANISM: Artificial Sequence
<220> FEATURE:
<223> OTHER INFORMATION: Fc varinat

<400> SEQUENCE: 9

Pro Pro Cys Pro Ala Pro Glu Phe Leu Gly Gly Pro Ser Val Phe Leu
 1               5                  10                  15

Phe Pro Pro Lys Pro Lys Asp Thr Leu Met Ile Ser Arg Thr Pro Glu
                20                  25                  30

Val Thr Cys Val Val Val Asp Val Ser Gln Glu Asp Pro Glu Val Gln
         35                  40                  45

Phe Asn Trp Tyr Val Asp Gly Val Glu Val His Asn Ala Lys Thr Lys
 50                  55                  60

Pro Arg Glu Glu Gln Phe Gln Ser Thr Tyr Arg Val Val Ser Val Leu
 65                  70                  75                  80

Thr Val Leu His Gln Asp Trp Leu Asn Gly Lys Glu Tyr Lys Cys Lys
                 85                  90                  95

Val Ser Asn Lys Gly Leu Pro Ser Ser Ile Glu Lys Thr Ile Ser Lys
                100                 105                 110

Ala Lys Gly Gln Pro Arg Glu Pro Gln Val Tyr Thr Leu Pro Pro Ser
            115                 120                 125

Gln Glu Glu Met Thr Lys Asn Gln Val Ser Leu Thr Cys Leu Val Lys
130                 135                 140

Gly Phe Tyr Pro Ser Asp Ile Ala Val Glu Trp Glu Ser Asn Gly Gln
145                 150                 155                 160
```

Pro Glu Asn Asn Tyr Lys Thr Thr Pro Pro Val Leu Asp Ser Asp Gly
              165                 170                 175

Ser Phe Phe Leu Tyr Ser Arg Leu Thr Val Asp Lys Ser Arg Trp Gln
            180                 185                 190

Glu Gly Asn Val Phe Ser Cys Ser Val Met His Glu Ala Leu His Asn
        195                 200                 205

His Tyr Thr Gln Lys Ser Leu Ser Leu Ser Leu Gly Lys
    210                 215                 220

<210> SEQ ID NO 10
<211> LENGTH: 90
<212> TYPE: DNA
<213> ORGANISM: Artificial Sequence
<220> FEATURE:
<223> OTHER INFORMATION: peptide linker

<400> SEQUENCE: 10
ggcggcggag gttcaggtgg tggtggctct ggcggtggag ggtcgggggg aggcggctct    60
ggaggagggg gctccggtgg gggaggtagc                                     90

<210> SEQ ID NO 11
<211> LENGTH: 30
<212> TYPE: PRT
<213> ORGANISM: Artificial Sequence
<220> FEATURE:
<223> OTHER INFORMATION: peptide linker

<400> SEQUENCE: 11

Gly Gly Gly Gly Ser Gly Gly Gly Ser Gly Gly Gly Ser Gly
1               5                   10                  15

Gly Gly Ser Gly Gly Gly Ser Gly Gly Gly Ser
            20                  25          30

<210> SEQ ID NO 12
<211> LENGTH: 2043
<212> TYPE: DNA
<213> ORGANISM: Artificial Sequence
<220> FEATURE:
<223> OTHER INFORMATION: alpha galactosidase-Fc fusion protein

<400> SEQUENCE: 12
atgcagctga ggaacccaga actacatctg gctgcgcgc ttgcgcttcg cttcctggcc     60
ctcgtttcct gggacatccc tggggctaga gcactggaca tggattggc aaggacgcct    120 accatgggct ggctgcactg ggagcgcttc atgtgcaacc ttgactgcca ggaagagcca    180
gattcctgca tcagtgagaa gctcttcatg agatggcag agctcatggt ctcagaaggc    240
tggaaggatg caggttatga gtacctctgc attgatgact gttggatggc tccccaaaga    300
gattcagaag gcagacttca ggcagaccct cagcgctttc ctcatgggat cgccagcta    360 gctaattatg ttcacagcaa aggactgaag ctagggattt atgcagatgt tggaaataaa    420
acctgcgcag gcttccctgg agttttggga tactacgaca ttgatgccca gaccttgct    480 gactggggag tagatctgct aaaatttgat ggttgttact gtgacagttt ggaaaattg    540 gcagatggtt ataagcacat gtccttggcc ctgaatagga ctgcagaag cattgtgtac    600 tcctgtgagt ggcctcttta tatgtggccc tttcaaaagc ccaattatac agaaatccga    660
cagtactgca atcactggcg aaattttgct gacattgatg attcctggaa agtataaag    720 agtatcttgg actggacatc tttttaaccag gagagaattg ttgatgttgc tggaccaggg    780

-continued

```
ggttggaatg acccagatat gttagtgatt ggcaactttg gcctcagctg aatcagcaa    840
gtaactcaga tggccctctg ggctatcatg gctgctcctt tattcatgtc taatgacctc   900
cgacacatca gccctcaagc caaagctctc cttcaggata aggacgtaat tgccatcaat   960
caggacccct tgggcaagca agggtaccag cttagacagg agacaacttt gaagtgtgg    1020
gaacgacctc tctcaggctt agcctgggct gtagctatga taaaccggca ggagattggt   1080
ggacctcgct cttataccat cgcagttgct tccctgggta aaggagtggc ctgtaatcct   1140
gcctgcttca tcacacagct cctccctgtg aaaaggaagc tagggttcta tgaatggact   1200
tcaaggttaa gaagtcacat aaatcccaca ggcactgttt tgcttcagct agaaaataca   1260
atgcagatgt cattaaaaga cttacttggc ggcggaggtt caggtggtgg tggctctggc   1320
ggtggagggt cggggggagg cggctctgga ggagggggct ccggtggggg aggtagccca   1380
ccatgcccag cacctgagtt cctgggggga ccatcagtct tcctgttccc cccaaaaccc   1440
aaggacaccc tcatgatctc ccggacccct gaggtcacat gcgtggtggt ggacgtgagc   1500
caggaagacc ctgaggtcca gttcaactgg tacgtggacg gcgtggaggt gcataatgcc   1560
aagacaaagc cgcgggagga gcagttccaa agcacgtacc gtgtggtcag cgtcctcacc   1620
gtcctgcacc aggactggct gaatggcaag gagtacaagt gcaaggtctc caacaaaggc   1680
ctcccatcct ccatcgagaa aaccatctcc aaagccaaag gcagccccg  agaaccacag   1740
gtgtacaccc tgcccccatc ccaggaggag atgaccaaga accaggtcag cctgacctgc   1800
ctggtcaaag gcttctatcc cagcgacatc gccgtggagt gggagagcaa tgggcagccg   1860
gagaacaact acaagaccac gcctcccgtg ctggactccg acggctcctt cttcctctac   1920
agcaggctaa ccgtggacaa gagcaggtgg caggagggga acgtcttctc atgctccgtg   1980
atgcatgagg ctctgcacaa ccactacacg cagaagagcc tctccctgtc tctgggtaaa   2040
tga                                                                 2043
```

<210> SEQ ID NO 13
<211> LENGTH: 680
<212> TYPE: PRT
<213> ORGANISM: Artificial Sequence
<220> FEATURE:
<223> OTHER INFORMATION: alpha galactosidase-Fc fusion protein

<400> SEQUENCE: 13

```
Met Gln Leu Arg Asn Pro Glu Leu His Leu Gly Cys Ala Leu Ala Leu
1               5                   10                  15

Arg Phe Leu Ala Leu Val Ser Trp Asp Ile Pro Gly Ala Arg Ala Leu
            20                  25                  30

Asp Asn Gly Leu Ala Arg Thr Pro Thr Met Gly Trp Leu His Trp Glu
        35                  40                  45

Arg Phe Met Cys Asn Leu Asp Cys Gln Glu Glu Pro Asp Ser Cys Ile
    50                  55                  60

Ser Glu Lys Leu Phe Met Glu Met Ala Glu Leu Met Val Ser Glu Gly
65                  70                  75                  80

Trp Lys Asp Ala Gly Tyr Glu Tyr Leu Cys Ile Asp Asp Cys Trp Met
                85                  90                  95

Ala Pro Gln Arg Asp Ser Glu Gly Arg Leu Gln Ala Asp Pro Gln Arg
            100                 105                 110

Phe Pro His Gly Ile Arg Gln Leu Ala Asn Tyr Val His Ser Lys Gly
        115                 120                 125

Leu Lys Leu Gly Ile Tyr Ala Asp Val Gly Asn Lys Thr Cys Ala Gly
```

-continued

```
            130                 135                 140
Phe Pro Gly Ser Phe Gly Tyr Tyr Asp Ile Asp Ala Gln Thr Phe Ala
145                 150                 155                 160

Asp Trp Gly Val Asp Leu Leu Lys Phe Asp Gly Cys Tyr Cys Asp Ser
                165                 170                 175

Leu Glu Asn Leu Ala Asp Gly Tyr Lys His Met Ser Leu Ala Leu Asn
            180                 185                 190

Arg Thr Gly Arg Ser Ile Val Tyr Ser Cys Glu Trp Pro Leu Tyr Met
            195                 200                 205

Trp Pro Phe Gln Lys Pro Asn Tyr Thr Glu Ile Arg Gln Tyr Cys Asn
210                 215                 220

His Trp Arg Asn Phe Ala Asp Ile Asp Asp Ser Trp Lys Ser Ile Lys
225                 230                 235                 240

Ser Ile Leu Asp Trp Thr Ser Phe Asn Gln Glu Arg Ile Val Asp Val
                245                 250                 255

Ala Gly Pro Gly Gly Trp Asn Asp Pro Asp Met Leu Val Ile Gly Asn
            260                 265                 270

Phe Gly Leu Ser Trp Asn Gln Gln Val Thr Gln Met Ala Leu Trp Ala
            275                 280                 285

Ile Met Ala Ala Pro Leu Phe Met Ser Asn Asp Leu Arg His Ile Ser
290                 295                 300

Pro Gln Ala Lys Ala Leu Leu Gln Asp Lys Asp Val Ile Ala Ile Asn
305                 310                 315                 320

Gln Asp Pro Leu Gly Lys Gln Gly Tyr Gln Leu Arg Gln Gly Asp Asn
                325                 330                 335

Phe Glu Val Trp Glu Arg Pro Leu Ser Gly Leu Ala Trp Ala Val Ala
            340                 345                 350

Met Ile Asn Arg Gln Glu Ile Gly Gly Pro Arg Ser Tyr Thr Ile Ala
            355                 360                 365

Val Ala Ser Leu Gly Lys Gly Val Ala Cys Asn Pro Ala Cys Phe Ile
370                 375                 380

Thr Gln Leu Leu Pro Val Lys Arg Lys Leu Gly Phe Tyr Glu Trp Thr
385                 390                 395                 400

Ser Arg Leu Arg Ser His Ile Asn Pro Thr Gly Thr Val Leu Leu Gln
                405                 410                 415

Leu Glu Asn Thr Met Gln Met Ser Leu Lys Asp Leu Leu Gly Gly Gly
            420                 425                 430

Gly Ser Gly Gly Gly Gly Ser Gly Gly Gly Ser Gly Gly Gly Gly
            435                 440                 445

Ser Gly Gly Gly Gly Ser Gly Gly Gly Ser Pro Pro Cys Pro Ala
    450                 455                 460

Pro Glu Phe Leu Gly Gly Pro Ser Val Phe Leu Phe Pro Pro Lys Pro
465                 470                 475                 480

Lys Asp Thr Leu Met Ile Ser Arg Thr Pro Glu Val Thr Cys Val Val
                485                 490                 495

Val Asp Val Ser Gln Glu Asp Pro Glu Val Gln Phe Asn Trp Tyr Val
            500                 505                 510

Asp Gly Val Glu Val His Asn Ala Lys Thr Lys Pro Arg Glu Glu Gln
            515                 520                 525

Phe Gln Ser Thr Tyr Arg Val Val Ser Val Leu Thr Val Leu His Gln
530                 535                 540

Asp Trp Leu Asn Gly Lys Glu Tyr Lys Cys Lys Val Ser Asn Lys Gly
545                 550                 555                 560
```

```
Leu Pro Ser Ser Ile Glu Lys Thr Ile Ser Lys Ala Lys Gly Gln Pro
            565                 570                 575

Arg Glu Pro Gln Val Tyr Thr Leu Pro Pro Ser Gln Glu Glu Met Thr
            580                 585                 590

Lys Asn Gln Val Ser Leu Thr Cys Leu Val Lys Gly Phe Tyr Pro Ser
            595                 600                 605

Asp Ile Ala Val Glu Trp Glu Ser Asn Gly Gln Pro Glu Asn Asn Tyr
        610                 615                 620

Lys Thr Thr Pro Pro Val Leu Asp Ser Asp Gly Ser Phe Phe Leu Tyr
625                 630                 635                 640

Ser Arg Leu Thr Val Asp Lys Ser Arg Trp Gln Glu Gly Asn Val Phe
            645                 650                 655

Ser Cys Ser Val Met His Glu Ala Leu His Asn His Tyr Thr Gln Lys
            660                 665                 670

Ser Leu Ser Leu Ser Leu Gly Lys
        675                 680

<210> SEQ ID NO 14
<211> LENGTH: 12
<212> TYPE: PRT
<213> ORGANISM: Homo sapiens

<400> SEQUENCE: 14

Glu Ser Lys Tyr Gly Pro Pro Cys Pro Ser Cys Pro
1               5                   10

<210> SEQ ID NO 15
<211> LENGTH: 4
<212> TYPE: PRT
<213> ORGANISM: Artificial Sequence
<220> FEATURE:
<223> OTHER INFORMATION: linker

<400> SEQUENCE: 15

Glu Gly Gly Ser
1

<210> SEQ ID NO 16
<211> LENGTH: 5
<212> TYPE: PRT
<213> ORGANISM: Artificial Sequence
<220> FEATURE:
<223> OTHER INFORMATION: linker

<400> SEQUENCE: 16

Glu Gly Gly Gly Ser
1               5
```